(12) United States Patent
Koutrokois

(10) Patent No.: US 9,423,579 B2
(45) Date of Patent: Aug. 23, 2016

(54) LATCH MECHANISM FOR COMMUNICATION MODULE

(71) Applicant: Finisar Corporation, Sunnyvale, CA (US)

(72) Inventor: Demetrios Koutrokois, San Francisco, CA (US)

(73) Assignee: FINISAR CORPORATION, Sunnyvale, CA (US)

( * ) Notice: Subject to any disclaimer, the term of this patent is extended or adjusted under 35 U.S.C. 154(b) by 0 days.

(21) Appl. No.: 14/198,338

(22) Filed: Mar. 5, 2014

(65) Prior Publication Data

US 2014/0254993 A1    Sep. 11, 2014

Related U.S. Application Data

(60) Provisional application No. 61/772,953, filed on Mar. 5, 2013.

(51) Int. Cl.
G02B 6/42    (2006.01)

(52) U.S. Cl.
CPC ............ *G02B 6/4261* (2013.01); *G02B 6/4277* (2013.01)

(58) Field of Classification Search
CPC ......................................................... G02B 6/42
USPC ...................................................... 385/92, 52
See application file for complete search history.

(56) References Cited

U.S. PATENT DOCUMENTS

| 2003/0171033 | A1 | 9/2003 | Bright | |
| 2004/0033027 | A1* | 2/2004 | Pang et al. | 385/53 |
| 2011/0267742 | A1* | 11/2011 | Togami et al. | 361/679.01 |
| 2013/0322832 | A1* | 12/2013 | Wang et al. | 385/92 |

FOREIGN PATENT DOCUMENTS

| EP | 606152 A2 * | 7/1994 | H01R 13/629 |
| EP | 1708311 | 10/2006 | |
| JP | 2002270286 A * | 9/2002 | H01R 13/629 |

OTHER PUBLICATIONS

Invitation to Pay Additional Fees and Communication Relating to the Results of the Partial International Search mailed Jun. 9, 2014 in related PCT Application No. PCT/US2014/020744.
International Search Report and Written Opinion mailed Aug. 8, 2014 in related PCT Application No. PCT/US2014/020744.

* cited by examiner

*Primary Examiner* — Kaveh C Kianni
(74) *Attorney, Agent, or Firm* — Maschoff Brennan

(57) ABSTRACT

Some embodiments include a latch mechanism and an optoelectronic module that includes the latch mechanism. The latch mechanism may include a driver, a follower, a pivot member, and a cam member. The driver may be configured to rotate relative to a housing of the optoelectronic module about an axis of rotation. The follower may be configured to be slidably positioned relative the housing. The follower may include a resilient member configured to interface with the housing and may define an opening including a protuberance. The pivot member may be coupled to the driver or to the housing and may define the axis of rotation. The cam member may be coupled to the driver and may be configured to engage the follower from within the opening so as to urge the follower to slide relative to the housing as the driver is rotated between a latched position and an unlatched position.

20 Claims, 19 Drawing Sheets

LATCH MECHANISM FOR COMMUNICATION MODULE

CROSS-REFERENCE TO RELATED APPLICATIONS

This patent application claims the benefit of and priority to U.S. Provisional Patent Application No. 61/772,953, filed Mar. 5, 2013.

FIELD

The embodiments discussed herein relate generally to communication modules. More particularly, example embodiments relate to latch mechanisms to selectively engage communication modules within a cage of a host device.

BACKGROUND

Communication modules, such as electronic or optoelectronic transceiver or transponder modules, are increasingly used in electronic and optoelectronic communication. Some modules are pluggable, which permits the module to be inserted into and removed from a housing of a host device, such as a host computer, switching hub, network router, or switch box. Latch mechanisms within the housing of the host device may be made to physically secure an inserted communication module into place. To remove the communication module, the latch mechanism may be manipulated to physically unsecure the communication module.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY OF SOME EXAMPLE EMBODIMENTS

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

Some example embodiments described herein generally relate to latch mechanisms to selectively engage communication modules within a cage of a host device.

In an example embodiment, an optoelectronic module includes a housing, a driver, a first pivot member, a second pivot member, a first cam member, a second cam member, and a follower. The driver may be rotatably coupled to the housing and may be configured to rotate relative to the housing about an axis of rotation. The driver may include a base and first and second arms that extend in a common direction from opposite ends of the base, where the common direction is orthogonal to the base. The first pivot member may be coupled to the first arm of the driver or to the housing. The second pivot member may be coupled to the second arm of the driver or to the housing. The first and second pivot members may define the axis of rotation. The first cam member may be coupled to the first arm of the driver at a first location radially offset from the axis of rotation. The second cam member may be coupled to the second arm of the driver at a second location radially offset from the axis of rotation. The follower may be slidably coupled to the housing and may be configured to slide forward or rearward relative to the housing in response to rotation of the driver about the axis of rotation.

In another example embodiment, a latch mechanism includes a driver, a follower, a pivot member, and a cam member. The driver may be configured to rotate relative to a housing about an axis of rotation. The follower may be configured to be slidably positioned relative the housing. The follower may include a resilient member configured to interface with the housing and may define an opening that includes a protuberance. The pivot member may be coupled to the driver. The pivot member may define the axis of rotation. The cam member may be coupled to the driver and may be configured to engage the follower from within the opening so as to urge the follower to slide relative to the housing as the driver is rotated between a latched position and an unlatched position.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DESCRIPTION OF EMBODIMENTS

Figure 1:
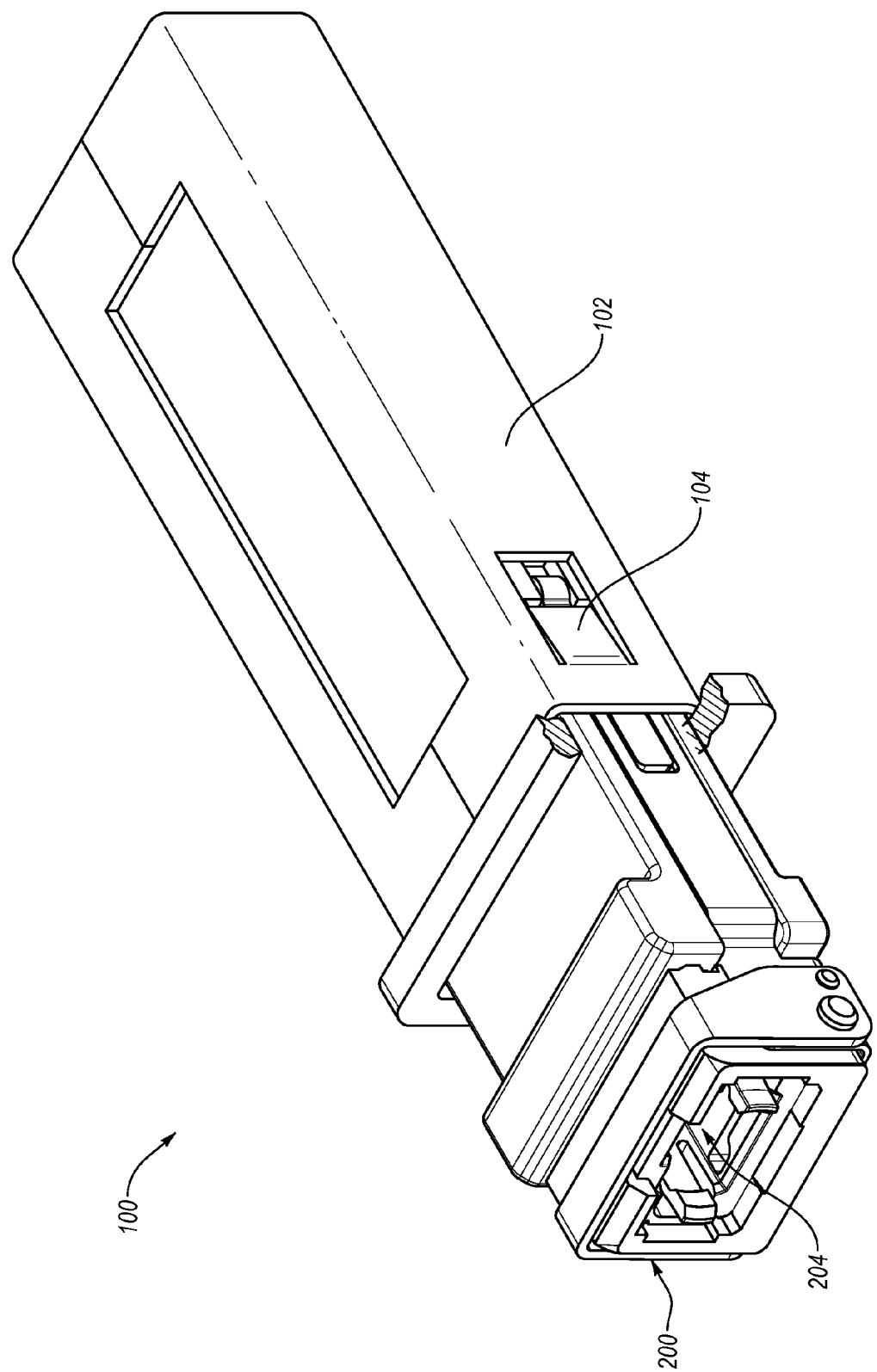
FIG. 1 is a top perspective view of portions of an example host device and an example optoelectronic module in a latched configuration and inserted into a cage of the host device.

Example embodiments relate to latch mechanisms to selectively engage communication modules with a cage of a host device and to selectively engageable communication modules that include such latch mechanisms. Embodiments described herein may include fewer and/or less complex parts, and may allow for simplified assembly compared to traditional and/or other latch mechanisms. For at least these reasons, embodiments of the latch mechanism may be less expensive and/or less expensive to implement with communication modules than conventional latch mechanisms.

Some example embodiments of the latch mechanisms disclosed herein may generate a highly reliable and highly repeatable mechanism to secure the latch in a latched position until the latch is purposely moved out of the latched position. The securing mechanism may provide a user with mechanical, visible, and/or audible feedback of the latch "snapping" into and out of the latch position as the latch is operated.

Reference will now be made to the figures wherein like structures will be provided with like reference designations. The drawings are diagrammatic and schematic representations of exemplary embodiments and, accordingly, are not limiting of the scope of the claimed subject matter, nor are the drawings necessarily drawn to scale. It should also be understood that many of the features of the disclosed embodiments may be substantially symmetrical. A pluralized reference to a feature may refer to a pair of similar features of which only one may be labeled in the drawings.

1. Example Host Device and Communication Module

FIG. 1 is a top perspective view of portions of an example host device 100 and an example optoelectronic module 200 inserted into a cage 102 of the host device 100. The optoelectronic module 200 is in a latched configuration. In the latched configuration, the optoelectronic module 200 engages, or can engage, the host device 100. In contrast, in an unlatched configuration, the optoelectronic module 200 disengages, or is disengaged from, the host device 100.

In general, the optoelectronic module 200 may be employed in the communication of optical signals in connection with the host device 100 being employed in the communication of corresponding electrical signals. For example, the host device 100 may provide outbound electrical data signals to the optoelectronic module 200, which the optoelectronic module 200 converts to outbound optical data signals that are emitted onto an optical network. Alternately or additionally, the optoelectronic module 200 may receive inbound optical data signals from the optical network, which the optoelectronic module 200 converts to inbound electrical data signals that are provided to the host device 100.

The optoelectronic module 200 may include a port 204 at a front of the optoelectronic module 200. The port 204 may be configured to receive and secure one or more optical fibers (not shown) and/or one or more fiber optic connectors to which the one or more optical fibers may be coupled. The optoelectronic module 200 can be configured for optical signal transmission and reception via the port 204 at a variety of data rates including, but not limited to, 1.25 gigabits per second (Gb/s), 2.125 Gb/s, 2.5 Gb/s, 4.25 Gb/s, 8.5 Gb/s, 10.3 Gb/s, 10.5 Gb/s, 11.3 Gb/s, 14.025 Gb/s, or 100 Gb/s, or higher. Furthermore, the optoelectronic module 200 can be configured for optical signal transmission and reception at various wavelengths including, but not limited to, 850 nanometers (nm), 1310 nm, 1470 nm, 1490 nm, 1510 nm, 1530 nm, 1550 nm, 1570 nm, 1590 nm, or 1610 nm. Further, the optoelectronic module 200 can be configured to support various communication protocols including, but not limited to, Optical Fast Ethernet, Optical Gigabit Ethernet, 10 Gigabit Ethernet, and 1×, 2×, 4×, 8×, and 16× Fibre Channel. In addition, although one example of the optoelectronic module 200 is configured to have a form factor that is substantially compliant with the CFP4 multi-source agreement (MSA), the optoelectronic module 200 can alternatively be configured in a variety of different form factors that are substantially compliant with other MSAs including, but not limited to, the CFP MSA, the CFP2 MSA, the QSFP MSA, the QSFP+ MSA the XFP MSA, the SFP MSA, or the SFP+ MSA. Finally, although the optoelectronic module 200 is illustrated as a pluggable optoelectronic transceiver module, example embodiments of the latch mechanism disclosed herein can alternatively be employed, for example, in connection with pluggable electronic transceiver modules, other pluggable electronic devices such as pluggable media drives, or the like. Electronic and optoelectronic transceiver and transponder modules may be generically referred to herein as communication modules. Moreover, some embodiments of the latch mechanism described herein may include a driver and a follower, as described in more detail below.

With continued reference to FIG. 1, the cage 102 is connected to a printed circuit board (not shown) of the host device 100. The cage 102 is configured to at least partially receive the optoelectronic module 200. The cage 102 includes a pair of inwardly biased leaf springs 104 located on opposite sides of the cage 102. Although the leaf springs 104 are inwardly biased, the leaf springs 104 do not substantially impede the insertion of the optoelectronic module 200 into the cage 102. The leaf springs 104 extend away or rearward from a front of the cage 102 where the optoelectronic module 200 is at least partially received.

The host device 100 generally forms an electrical connection with the optoelectronic module 200 through which electrical signals may be communicated between the host device 100 and the optoelectronic module 200. For example, the host device 100 may include a connector that electrically and communicatively couples a printed circuit board (PCB) (not shown in FIG. 1) of the host device 100 to a PCB edge connector (not shown in FIG. 1) of the optoelectronic module 200. Alternately or additionally, the cage 102 may ground the optoelectronic module 200 to the host device 100.

Figure 2A:
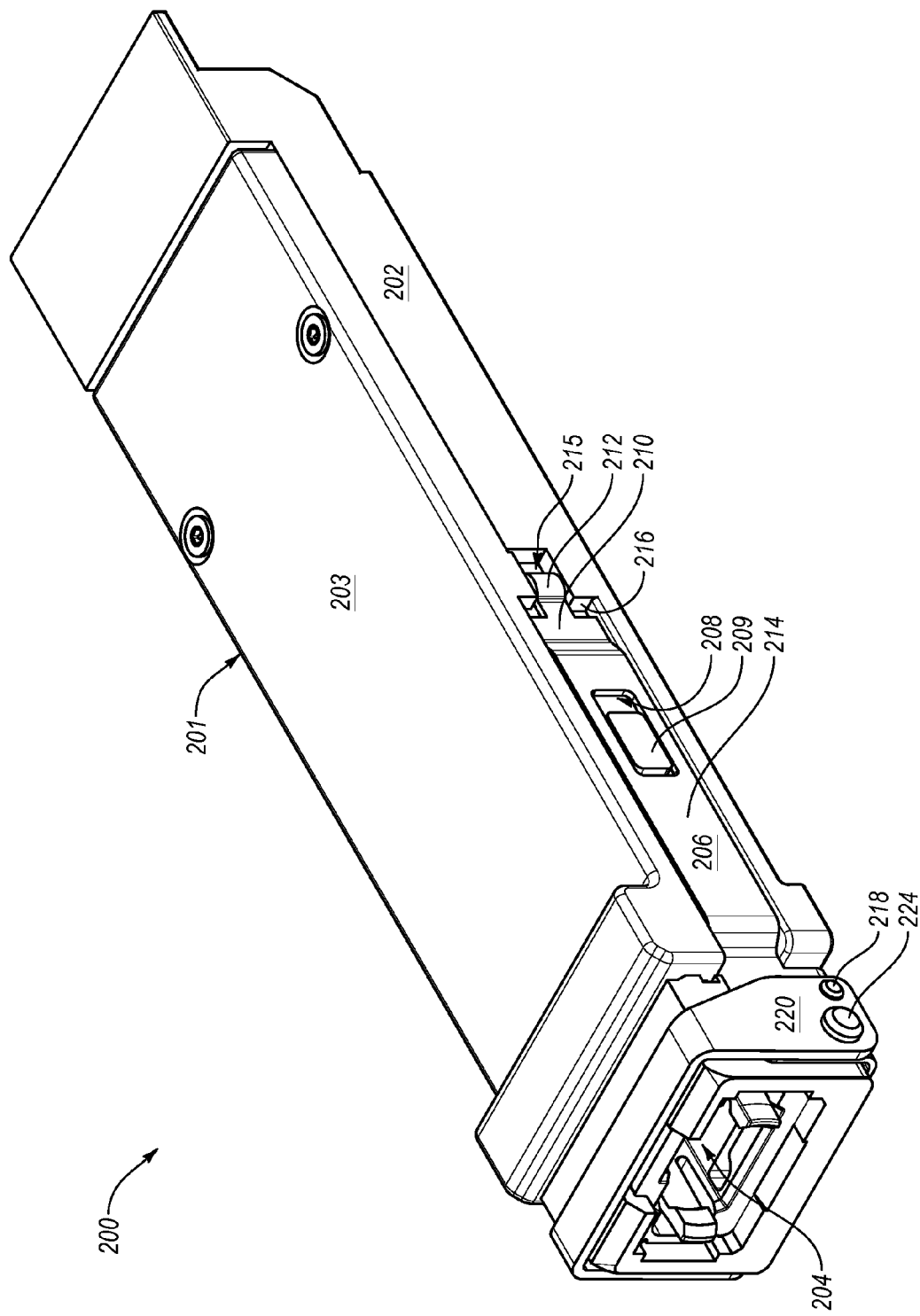
FIG. 2A is a top perspective view of the example optoelectronic module of FIG. 1 in a latched configuration with the portions of the example host device omitted.
Figure 2B:
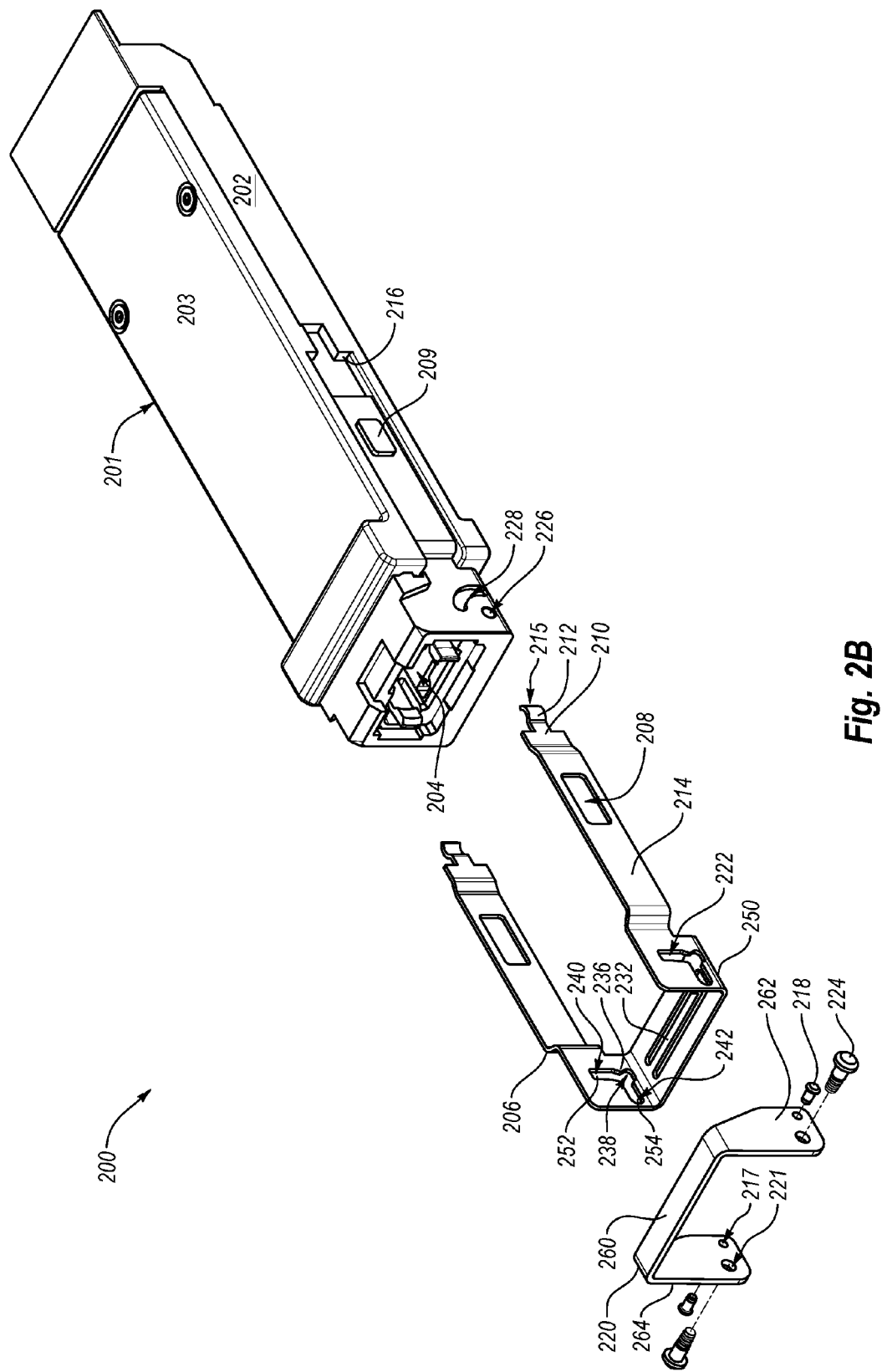
FIG. 2B is a top perspective exploded view of the example optoelectronic module of FIG. 2A.
Figure 2C:
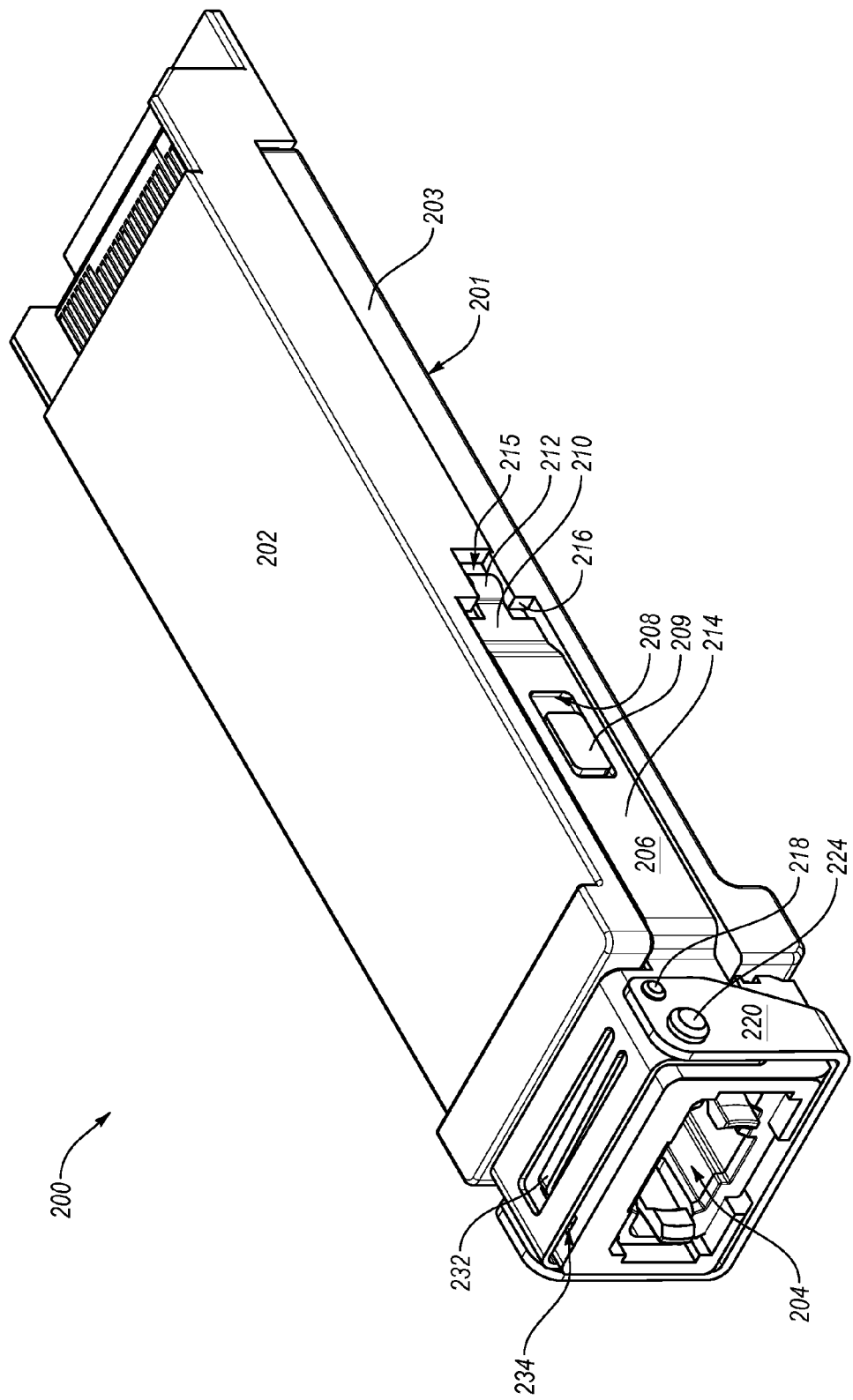
FIG. 2C is a bottom perspective view of the example optoelectronic module of FIG. 2A in the latched configuration.
Figure 2D:
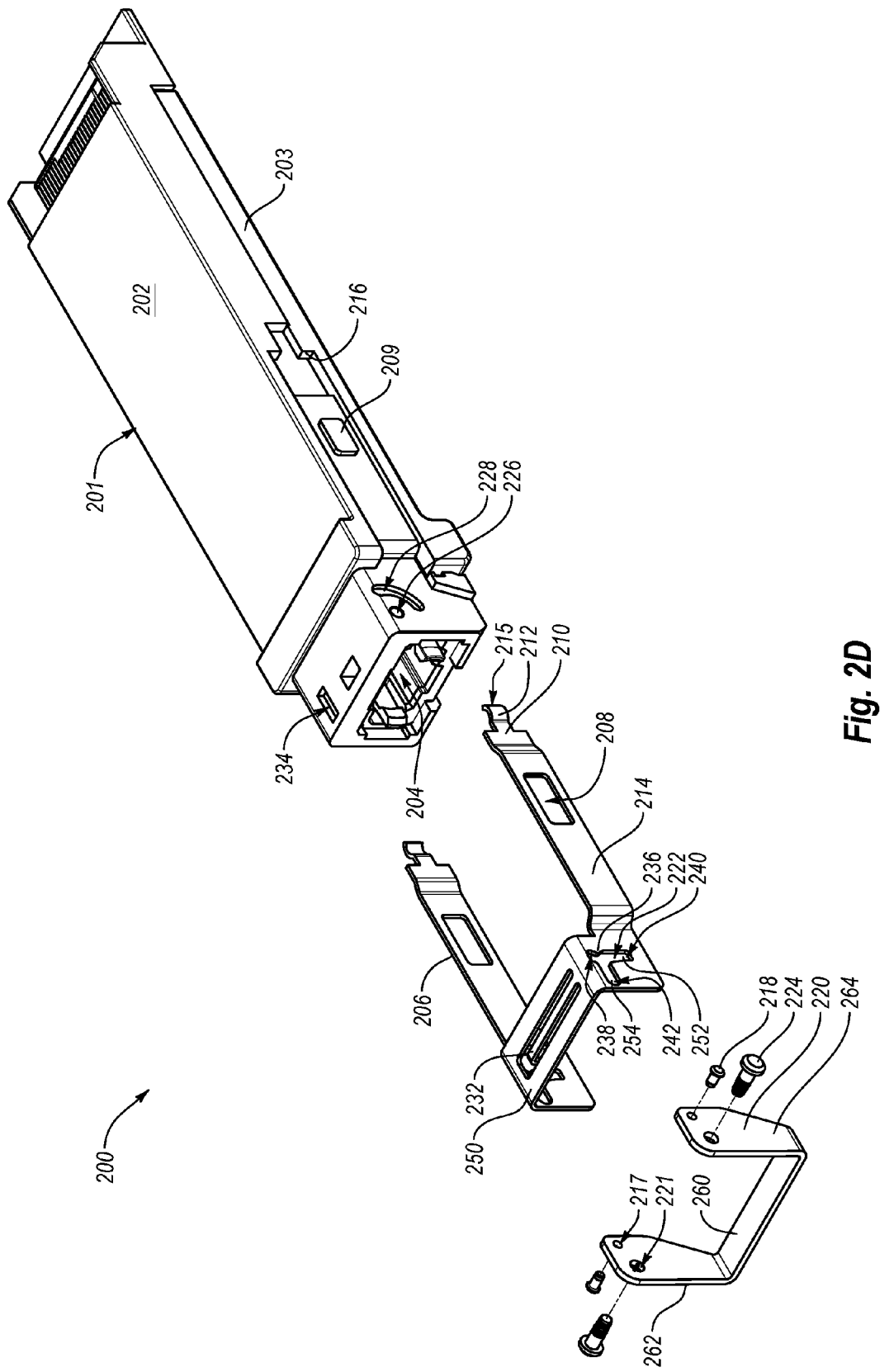
FIG. 2D is a bottom perspective exploded view of the example optoelectronic module of FIG. 2A.
Figure 2E:
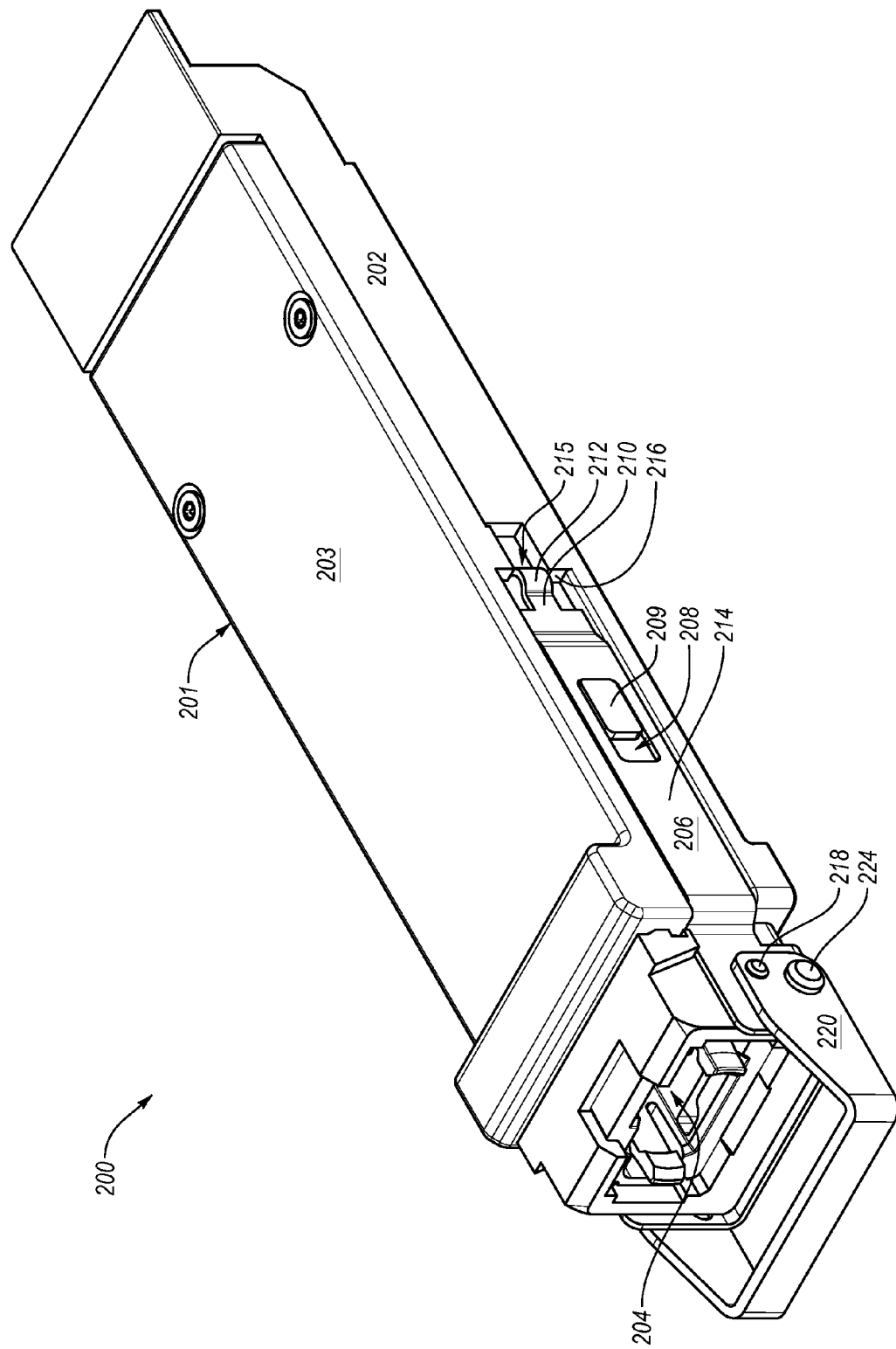
FIG. 2E is a top perspective view of the example optoelectronic module of FIG. 2A in an unlatched configuration.
Figure 2F:
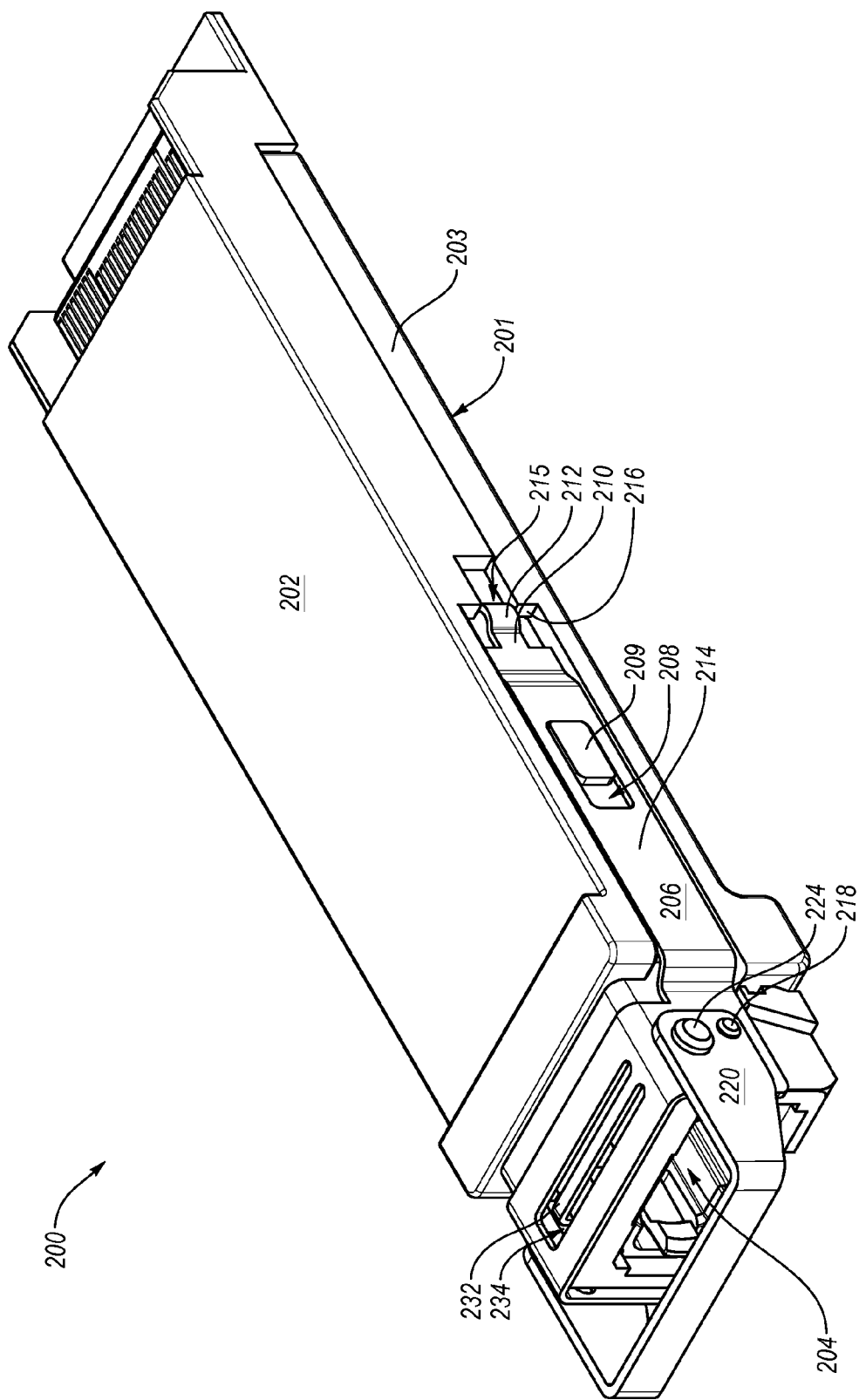
FIG. 2F is a bottom perspective view of the example optoelectronic module of FIG. 2A in the unlatched configuration.

FIGS. 2A-2F are various views of the example optoelectronic module 200 with the portions of the example host device 100 of FIG. 1 omitted. FIGS. 2A and 2E are top perspective views, FIG. 2B is a top perspective exploded view, FIGS. 2C and 2F are bottom perspective views, and FIG. 2D is a bottom perspective exploded view. FIGS. 2A and 2C show the optoelectronic module 200 in a latched configuration. FIGS. 2E and 2F show the optoelectronic module 200 in an unlatched configuration.

The example optoelectronic module 200 includes a bottom housing 202 and a top housing 203. Together, the bottom housing 202 and the top housing 203 form what may be generally referred to as a housing 201 of the optoelectronic module 200. The bottom housing 202 and/or the top housing 203 may at least partially surround receiver and/or transmitter circuitry (not shown), including a PCB having an edge connector (not shown) configured to be electrically coupled to a host device such as the host device 100 of FIG. 1.

2. Example Latch Mechanism

The optoelectronic module 200 includes a driver 220 and a follower 206 which collectively form a latch mechanism. The driver and the follower 206 may be formed in various ways, including, but not limited to, being formed from metal or molded from hard plastic.

The follower 206 is configured to be slidingly positioned relative to the housing 201. The follower 206 is shown in a first location relative to the housing 201, which may be described herein as a latched location. In the disclosed embodiment, the follower 206 includes a pair of follower arms 214. The follower arms 214 may be configured to be positioned on opposite sides of the housing 201. In addition, and as illustrated, the follower 206 may include a base 250 and two upright portions that extend in a common direction that is orthogonal or substantially orthogonal to the base 250 of the follower and from opposite ends of the base 250 of the follower. Each of the arms 214 may extend rearward from a corresponding one of the upright portions. In addition, each of the two upright portions may define an "L" like opening 222 that includes an upright slot 252 connected to a horizontal slot 254 described in more detail herein.

A front of the housing 201, or at least a portion thereof, may be at least partially disposed between the two upright portions of the follower 206. The two upright portions of the follower 206 may be at least partially disposed between two arms of the driver 220.

The follower arms 214 include recesses 210. The recesses 210 and the housing 201 are configured such that leaf springs of a cage, such as the leaf springs 104 of the cage 102 of FIG. 1, may fit at least partially within the recesses 210 when the optoelectronic module 200 is in the latched configuration.

The housing 201 includes shoulders 216 proximate to the recesses 210. The shoulders 216 are configured to at least partially abut the leaf springs 104 positioned within the recesses 210. When the optoelectronic module 200 is in the latched configuration, the leaf springs 104 of the host device 100 engage the shoulders 216 of the optoelectronic module 200 to prevent the optoelectronic module 200 from moving significantly within the cage 102, and more particularly, from being removed from the cage 102. As a result, unintentional disconnection and/or removal of the optoelectronic module 200 from the host device 100 can be reduced and potentially eliminated.

As shown, in some embodiments, the follower arms 214 may include or define electromagnetic interference (EMI) windows 208. The EMI windows 208 may allow EMI protrusions 209 on the housing 201 to make contact with an EMI shield (not shown) of the cage 102.

Increased contact between the housing 201 and an EMI shield by way of the EMI protrusions 209 may improve EMI shielding. In some embodiments, the follower 206 and the housing 201, including the EMI protrusions 209, are configured such that the EMI shield of the cage 102 makes contact with only the housing 201 and not the follower 206.

Although the EMI windows 208 are shown as being located or defined completely within the follower arms 214, the EMI windows 208 may alternately or additionally be located at the top and/or bottom edges of the follower arms 214. Furthermore, as best seen in FIGS. 2A, 2C, 2E, and 2F, the EMI windows 208 and EMI protrusions 209 may be shaped such that the follower 206 can slide relative to the housing 201 as the driver 220 is rotated between the latched position (as shown in FIGS. 2A and 2C) and the unlatched position (as shown in FIGS. 2E and 2F). In particular, the EMI windows 208 may be oversized in the sliding direction of the follower 206 relative to the EMI protrusions 209. As such, the follower 206 to may be able to slide at least some distance relative to the housing 201 before (or without) a front or back end of the EMI windows 208 engages the EMI protrusions 209 and prevents the follower 206 from the relative sliding.

Electromagnetic interference leaked from the cage 102 may be reduced and EMI performance of the optoelectronic module 200 and nearby modules (not shown) may be improved compared to conventional optoelectronic modules that do not facilitate contact between the housing and the EMI shield near the follower arms. For example, conventional latch mechanisms may include follower arms interposed between the housing and the EMI shield such that the EMI shield makes little or no contact with the sides of the housing.

The follower arms 214 may each include one or more fingers 215 that extend beyond the shoulders 216 when the optoelectronic module 200 is in the latched configuration (as shown in FIGS. 2A and 2C). The fingers 215 may include ramped surfaces 212. When the optoelectronic module 200 is moved from the latched configuration to the unlatched configuration (as shown in FIGS. 2E and 2F), the fingers 215 move toward the front of the optoelectronic module 200 and the ramped surfaces 212 move the leaf springs 104 out of the recesses 210 such that the leaf springs 104 no longer abut or engage the shoulders 216. When the leaf springs 104 no longer abut or engage the shoulders 216, the optoelectronic module 200 may be removed from the cage 102. Moving the optoelectronic module 200 from the latched configuration to the unlatched configuration is generally accomplished when the driver 220 is rotated from the latched position (as shown in FIGS. 2A and 2C) to the unlatched position (as shown in FIGS. 2E and 2F).

The optoelectronic module 200 is configured such that the driver 220 rotates relative to the housing 201. The optoelectronic module 200 may include members such as pivot pins 224 that interface with the housing 201 and the driver 220 to allow the driver 220 to rotate relative to the housing 201 about the pivot pins 224 and/or about a rotational axis defined by the pivot pins 224 and corresponding openings 226 in the housing 201. As shown in FIGS. 2B and 2D, the pivot pins 224 may be inserted through openings 221 in the driver 220 and into the housing 201 via the openings 226. In some embodiments, the pivot pins 224 are externally threaded along at least a portion of a shaft of each of the pivot pins 224 and the openings 226 of the housing 201 include complementary internal threads. The pivot pins 224 may be secured at least axially to the housing 201 and/or the driver 220. In place of the pivot pins 224 and the openings 226, the housing 201 may include projections (not shown) that are received into the openings 221 of the driver 220 and that define the rotational axis about which the driver 220 may rotate. Alternatively, in place of the pivot pins 224 and the openings 221, the driver 220 may include projections (not shown) that are received into the openings 226 of the housing 201 and that define the rotational axis about which the driver 220 may rotate.

The driver 220 and the follower 206 are configured such that the follower 206 moves relative to the housing 201 when the driver 220 is rotated between the latched and unlatched positions. In particular, the follower 206 slides forward relative to the housing 201 responsive to rotation of the driver 220 from the latched position to the unlatched position, and slides backward relative to the housing 201 responsive to rotation of the driver from the unlatched position to the latched position. As may be best illustrated in FIGS. 2B and 2D, cam pins 218 may be at least partially inserted through openings 217 in the driver 220 and at least partially in openings 222 of the follower 206. Optionally, the cam pins 218 may be at least partially received in slots 228 formed in the housing 201. The slots 228 may be shaped to encourage the cam pins 218, and by extension, the driver 220 to follow a desired semicircular path as the driver 220 is rotated. Alternately or additionally, the slots 228 may be shaped to accommodate the cam pins 218 as they follow the desired semicircular path as the driver 220 is rotated.

Each of the cam pins 218 includes a head positioned on an outside of a corresponding arm of the driver 220 and a shaft that extends from the head of the corresponding cam pin 218 through corresponding opening 217 of the corresponding arm of the driver 220 toward the opposite arm of the driver 220.

The openings 222 may be shaped to encourage the follower 206 to move between the latched location (as shown in FIGS. 2A and 2C) and the unlatched location (as shown in FIGS. 2E and 2F) as the driver 220 is rotated between the latched and unlatched positions, respectively. The cam pins 218 may interface with the openings 222 such that the cam pins 218 urge the follower 206 to the unlatched location when the driver 220 is rotated from the latched position to the unlatched position. Similarly, the cam pins 218 may interface with the openings 222 such that the cam pins 218 urge the follower 206 to the latched location when the driver 220 is rotated from the unlatched position to the latched position.

In some embodiments, the openings 222 may include protuberances 236. The cam pins 218 may interface with the protuberances 236 such that the follower 206 is urged toward an intermediate position relative to the housing 201 as the cam pins 218 travel along the protuberances 236.

The protuberances 236 may generally urge the follower 206 against a biasing device such that a user applies force to the driver 220 to cause the cam pins 218 to travel along the protuberances 236. For example, the follower 206 may be urged against a cantilever spring 232 as the cam pins 218 travel along the protuberances 236, causing the cantilever spring 232 to urge the follower 206 with increased force. Although illustrated as a cantilever spring 232, the biasing device may include other resilient members, such as torsion springs, coil springs, leaf springs, rubber members, and the like. Although many other springs may be employed, the cantilever spring 232 or other resilient members formed as a part of follower 206 may advantageously reduce the number of parts and/or the assembly complexity of the latch mechanism.

As shown in FIG. 2C, the cantilever spring 232 interfaces with the housing 201 via an indentation 234 such that the cantilever spring 232 urges the follower 206 toward the front of the optoelectronic module 200 when the optoelectronic module 200 is in the latched configuration and when the cam pins 218 travel along the protuberances 236.

The protuberances 236 may be positioned such that the openings 222 include concavities 238. The cam pins 218 may be located at least partially in the concavities 238 when the optoelectronic module 200 is in the latched configuration. The protuberances 236 may encourage the optoelectronic module 200 to stay in the latched position in the absence of the driver 220 being purposefully rotated. As the optoelectronic module 200 moves from the latched position to the unlatched position, the cam pins 218 slide from the concavities 238 along the protuberances 236 such that the follower 206 is urged toward the rear of the optoelectronic module 200. As the follower 206 is urged toward the rear of the optoelectronic module 200, the cantilever spring 232 is further resiliently deformed and urges the follower 206 toward the front of the optoelectronic module 200.

Put another way, the protuberances 236, the concavities 238 and the accompanying cantilever spring 232 may form a detent such that the optoelectronic module 200 remains securely in the latched configuration until a user purposely rotates the driver 220 out of its latched position. Advantageously, the detent may provide physical, visible, and/or audible feedback to a user of the latch mechanism. The protuberances 236, concavities 238 and accompanying cantilever spring 232 may cause the driver 220 to "snap" into and out of the latched position.

In some embodiments, a similar detent may be formed for securing the optoelectronic module 200 in the unlatched configuration until a user purposely rotates the driver 220 out of its unlatched position.

When the driver 220 is purposely rotated from the latched position toward the unlatched position about the pivot pins 224, the cam pins 218 travel along the protuberances 236 such that the cam pins 218 are released from the latched position. As the driver 220 continues to rotate toward the unlatched position, the cam pins 218 travel along slots 240 of the openings 222. As the cam pins 218 travel along the slots 240, the cam pins 218 interface with walls of the slots 240 such that the cam pins 218 urge the follower 206 toward the front of the optoelectronic module 200 and toward the unlatched location.

The openings 222 may include slots 242 such that the pivot pins 224 do not encumber the follower 206 as it travels between the latched and unlatched positions.

The rotation of the driver 220 may be stopped in the unlatched position when the follower 206 is in the unlatched location and the optoelectronic module 200 is in the unlatched configuration. The movement of the driver 220 and/or the follower 206 may be stopped when the cam pins 218 abut the end of the slots 228 and/or the openings 222, the EMI windows 208 abut the EMI protrusions 209, or the like.

Thus, in summary, when the driver 220 is rotated from the latched position to the unlatched position, the cam pins 218 may generally move in a semicircular path corresponding to the slots 228 from the bottom/rear of the slots 228 to the top/front of the slots 228. As the cam pins 218 move in the semicircular path, the cam pins 218 engage the follower 206 at the front of the slots 240 of the openings 222 and cause the follower 206 to slide forward relative to the housing 201. When the cam pins 218 reach the top/front of the slots 228 or the top of the slots 240 of the openings 222, and/or when the rear of each of the EMI windows 208 abuts the rear of each of the EMI protrusions 209, the follower 206 may stop at its forward-most position relative to the housing 201.

Analogously, when the driver 220 is rotated from the unlatched position to the latched position, the cam pins 218 may generally move in the semicircular path corresponding to the slots 228 from the top/front of the slots 228 to the bottom/rear of the slots 228. As the cam pins 218 move in the semicircular path, the cam pins 218 engage the follower 206 at the rear of the slots 240 of the openings 222 and cause the follower 206 to slide rearward relative to the housing 201. When the cam pins 218 reach the bottom/rear of the slots 228 or the concavities 238 of the openings 222, and/or when the front of each of the EMI windows 208 abuts the front of each of the EMI protrusions 209, the follower 206 may stop at its rearward-most position relative to the housing 201.

As may be best illustrated in FIG. 2F, in some embodiments, the cantilever spring 232 is not deformed when the optoelectronic module 200 is in the unlatched position such that the cantilever spring 232 does not urge the follower 206 when in the unlatched position.

3. Other Embodiments

Figure 3A:
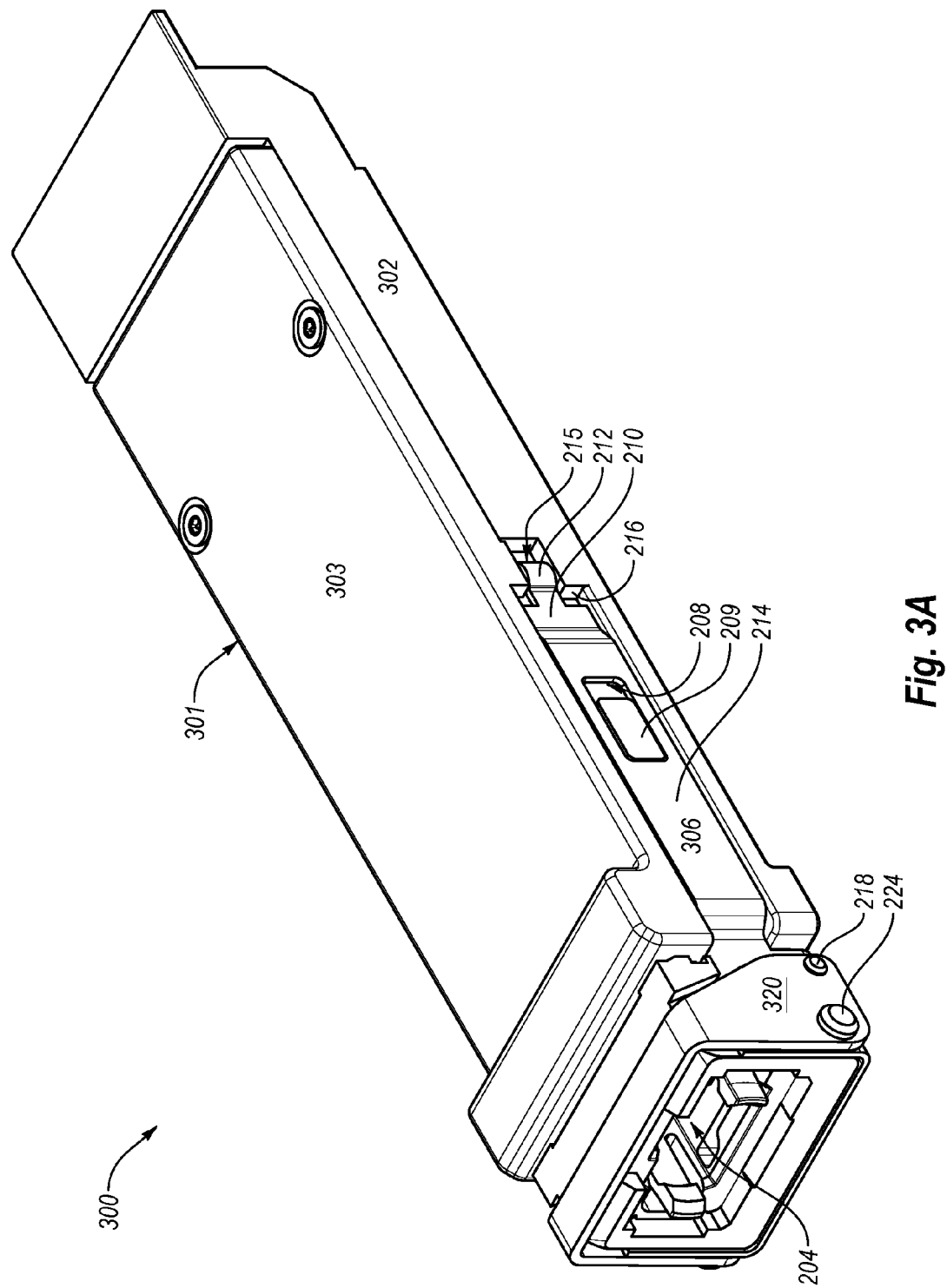
FIG. 3A is a top perspective view of another example optoelectronic module in a latched configuration.
Figure 3B:
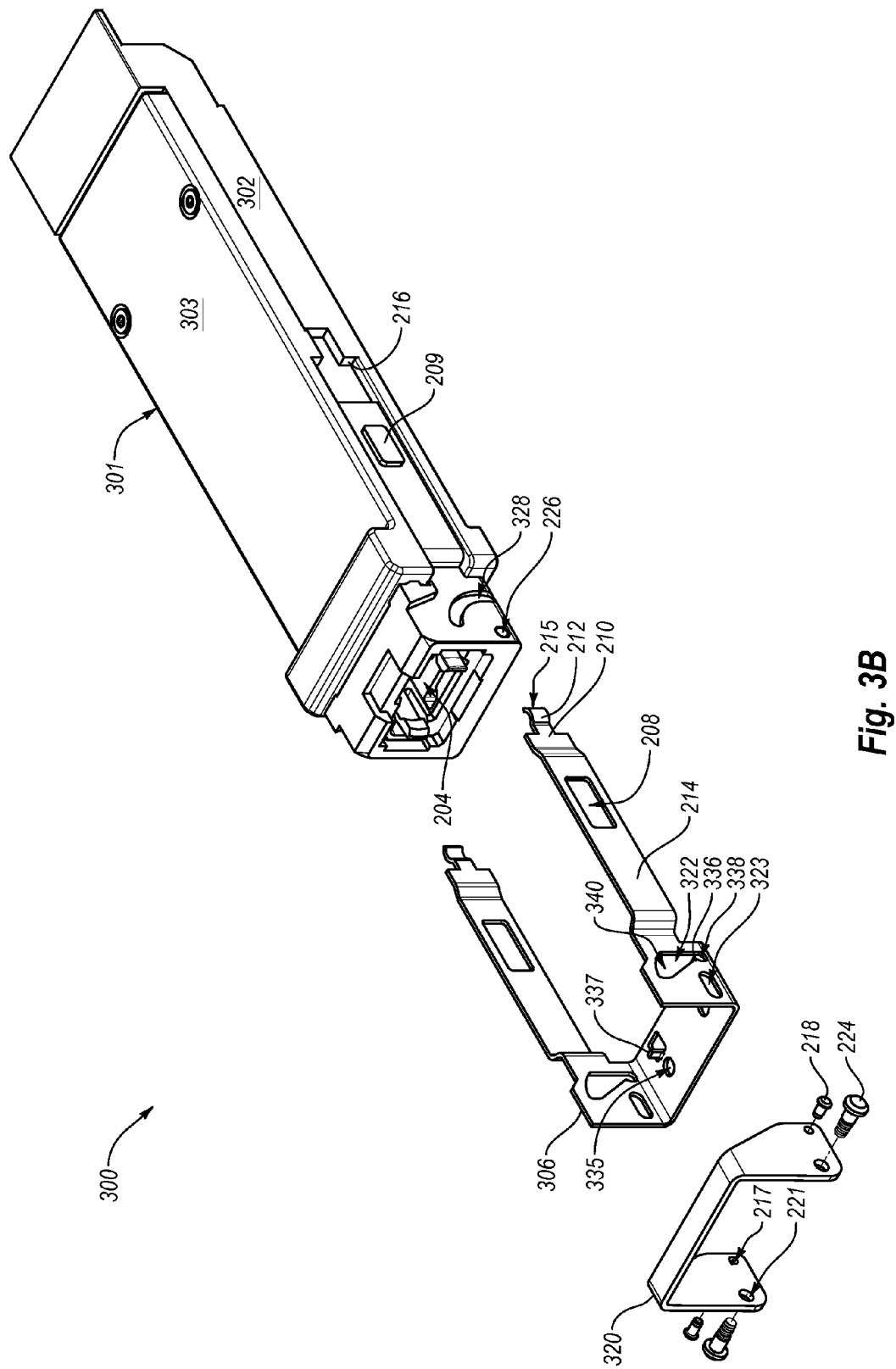
FIG. 3B is a top perspective exploded view of the example optoelectronic module of FIG. 3A.
Figure 3C:
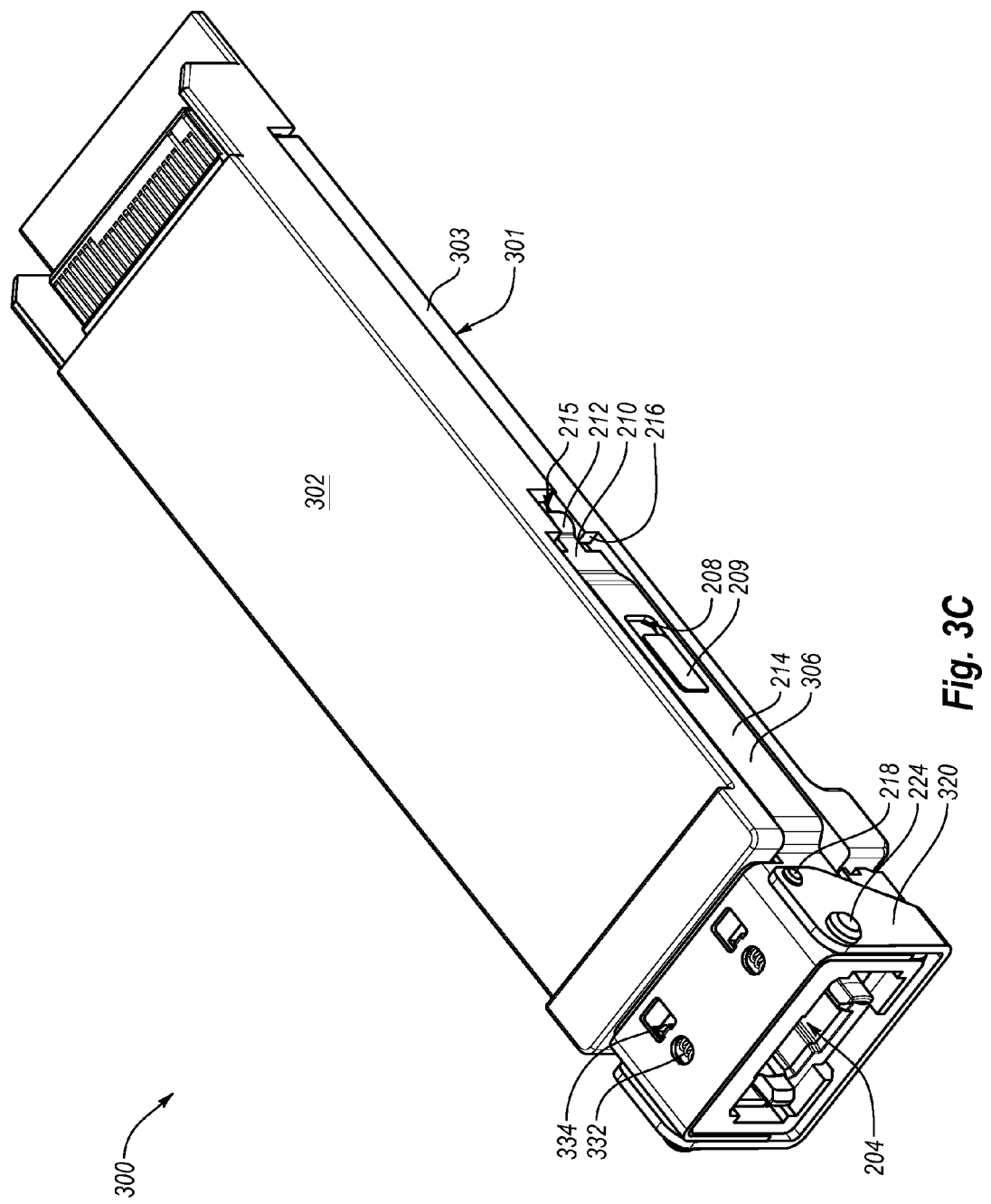
FIG. 3C is a bottom perspective view of the example optoelectronic module of FIG. 3A in the latched configuration.
Figure 3D:
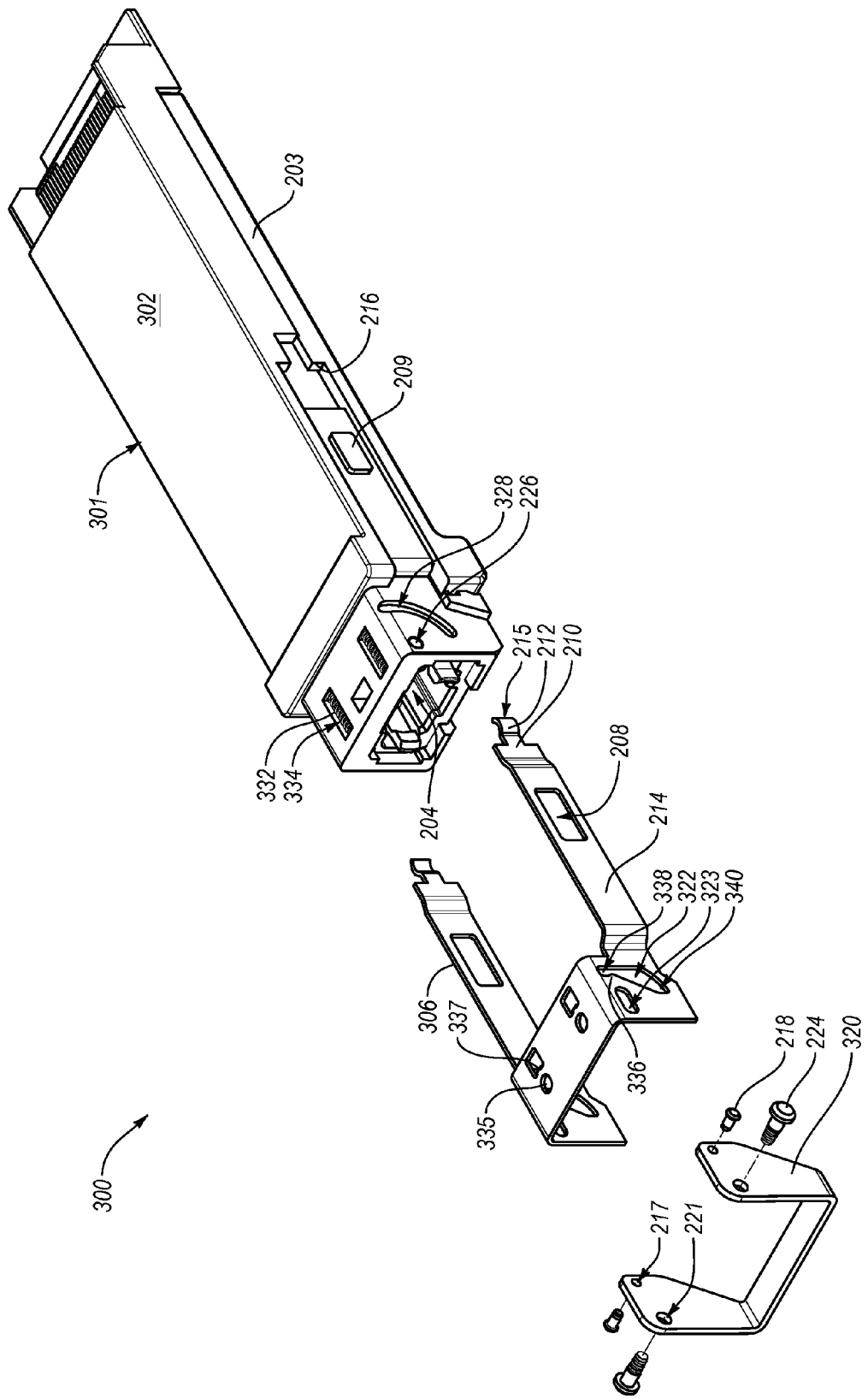
FIG. 3D is a bottom perspective exploded view of the example optoelectronic module of FIG. 3A.
Figure 3E:
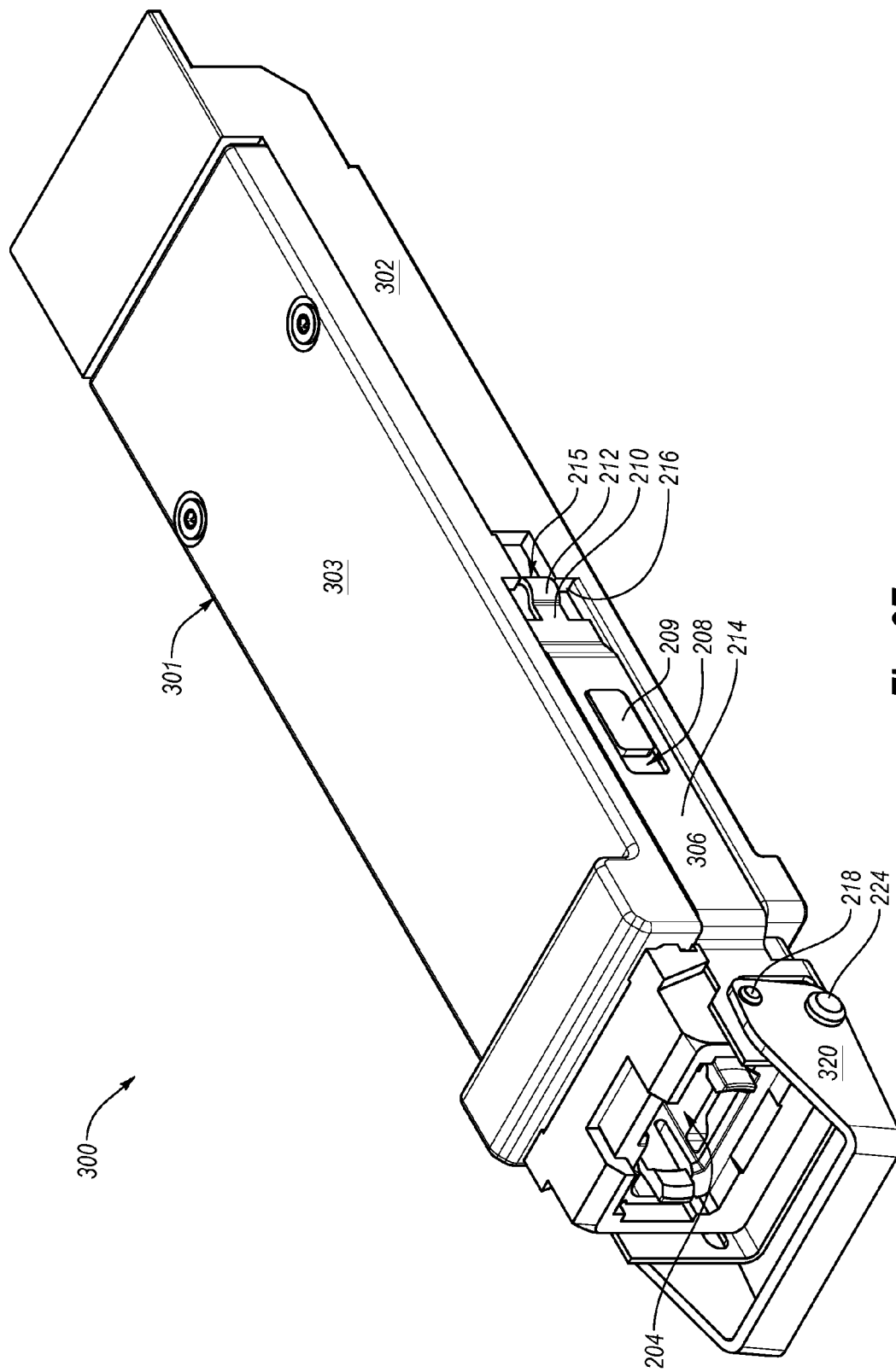
FIG. 3E is a top perspective view of the example optoelectronic module of FIG. 3A in an unlatched configuration.
Figure 3F:
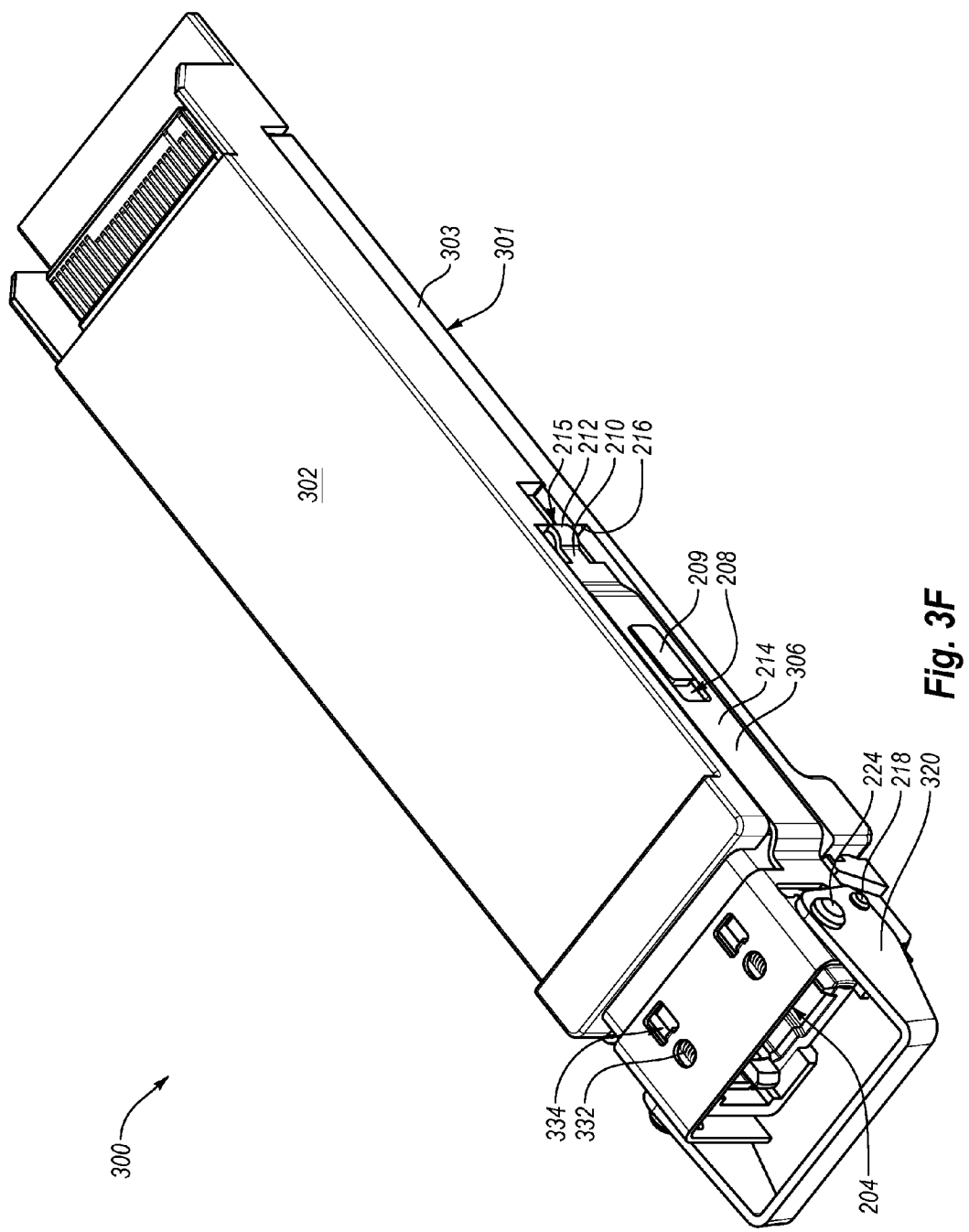
FIG. 3F is a bottom perspective view of the example optoelectronic module of FIG. 3A in the unlatched configuration.

FIGS. 3A-3F are various views of another example optoelectronic module 300. FIGS. 3A and 3E are top perspective views, FIG. 3B is a top perspective exploded view, FIGS. 3C and 3F are bottom perspective views, and FIG. 3D is a bottom perspective exploded view. FIGS. 3A and 3C show the optoelectronic module 300 in a latched configuration. FIGS. 3E and 3F show the optoelectronic module 300 in an unlatched configuration.

The optoelectronic module 300 includes a bottom housing 302 and a top housing 303. Together, the bottom housing 302 and the top housing 303 form what may be generally referred to as a housing 301 of the optoelectronic module 300. The housing 301, the bottom housing 302, and the top housing 303 may generally correspond to the housing 201, the bottom housing 202, and the top housing 203 of FIGS. 2A-2F.

The optoelectronic module 300 includes a driver 320 and a follower 306. The driver 320 and follower 306 may generally correspond to the driver 220 and follower 206 of FIGS. 2A-2F.

Cam pins 218 may be inserted through openings 217 in the driver 320 and at least partially in openings 322 of the follower 306. Although optional, the cam pins 218 may be received in slots 328 generally corresponding to slots 228 of FIGS. 2A-2F.

The openings 322 may be shaped to encourage the follower 306 to move between the latched location (as shown in FIGS. 3A and 3C) and the unlatched location (as shown in FIGS. 3E and 3F) as the driver 320 is rotated between the latched and unlatched positions, respectively. The cam pins 218 may interface with upper sections 340, protuberances 336 and concavities 338 of the openings 322 such that the cam pins 218 urge the follower 306 to the unlatched location when the driver 320 is rotated from the latched position to the unlatched position. The protuberances 336 and concavities 338 generally correspond, at least in function, to the protuberances 236 and concavities 238 of the optoelectronic module 200 of FIGS. 2A-2F.

The optoelectronic module 300 includes compression springs 332 and indentations 334. The follower 306 may include engaging members 337 configured to interface with the compression springs 332 such that the compression springs 332 urge the follower 306 toward the rear of the housing 301. In some embodiments, the follower 306 may include spring openings 335 through which the compression springs 332 may be inserted into the indentations 334 during assembly of the optoelectronic module 300. The compression springs 332 may be configured to form a detent with the protuberances 336 and the concavities 338 in a manner generally corresponding to that of the cantilever spring 232 of FIGS. 2A-2F.

The optoelectronic module 300 may also include slots 323 through which the pivot pins 224 may be inserted. The slots 323 may generally correspond to the slots 242 of FIGS. 2A-2F.

Operation of the driver 320 and the follower 306 is generally similar to operation of the driver 220 and the follower 206 and will not be described again.

Figure 4A:
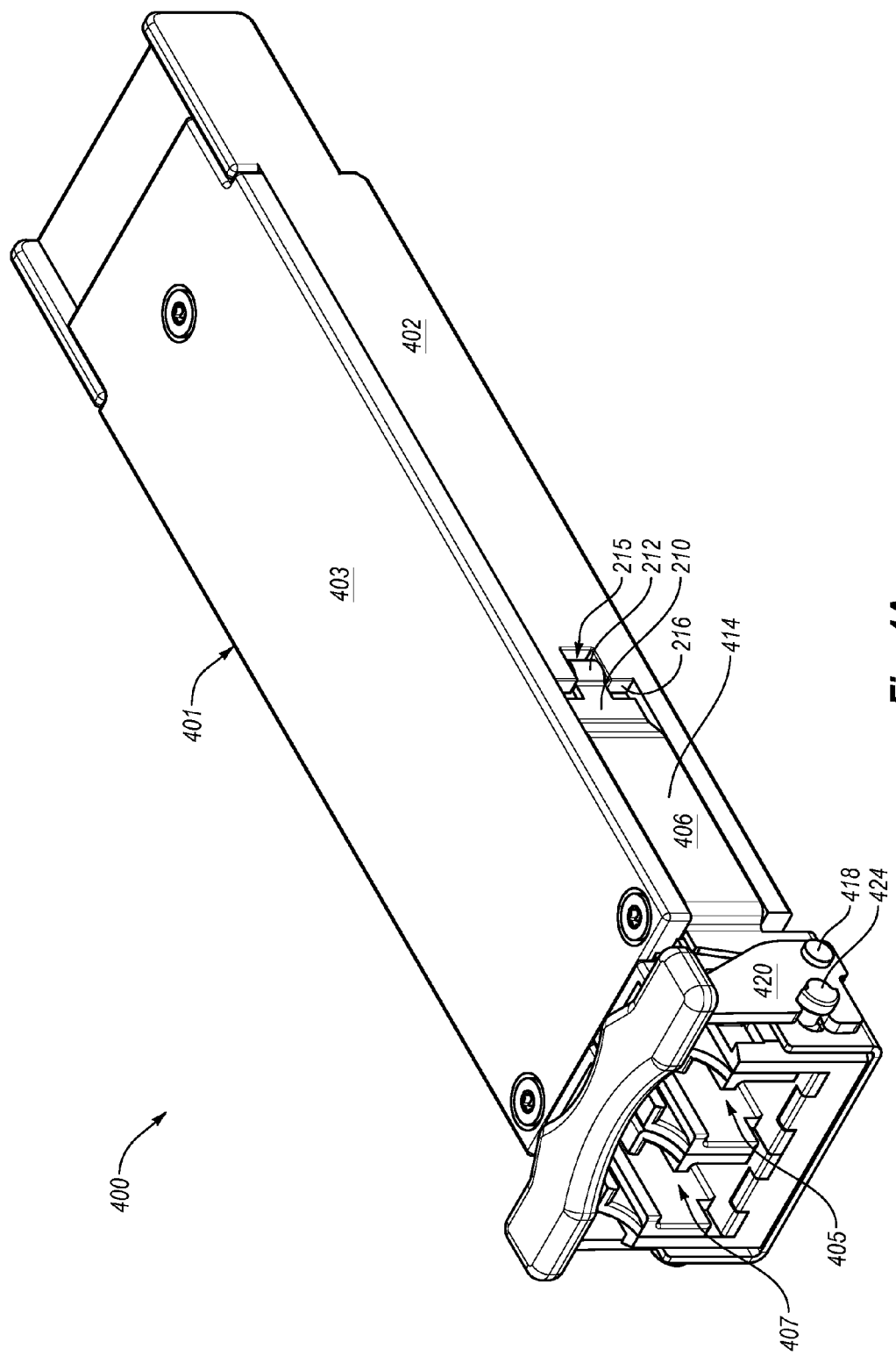
FIG. 4A is a top perspective view of yet another example optoelectronic module in a latched configuration.
Figure 4B:
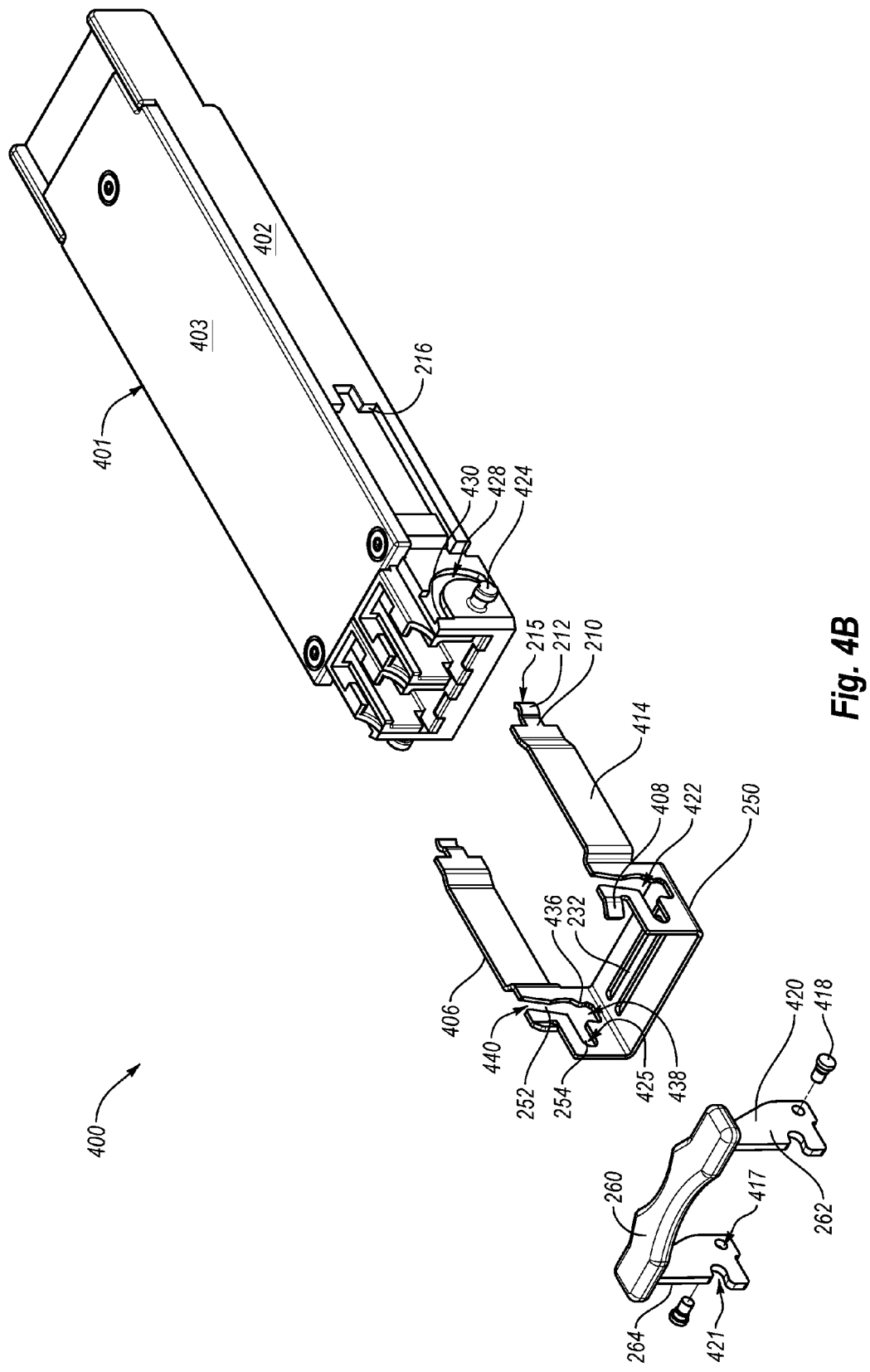
FIG. 4B is a top perspective exploded view of the example optoelectronic module of FIG. 4A.
Figure 4C:
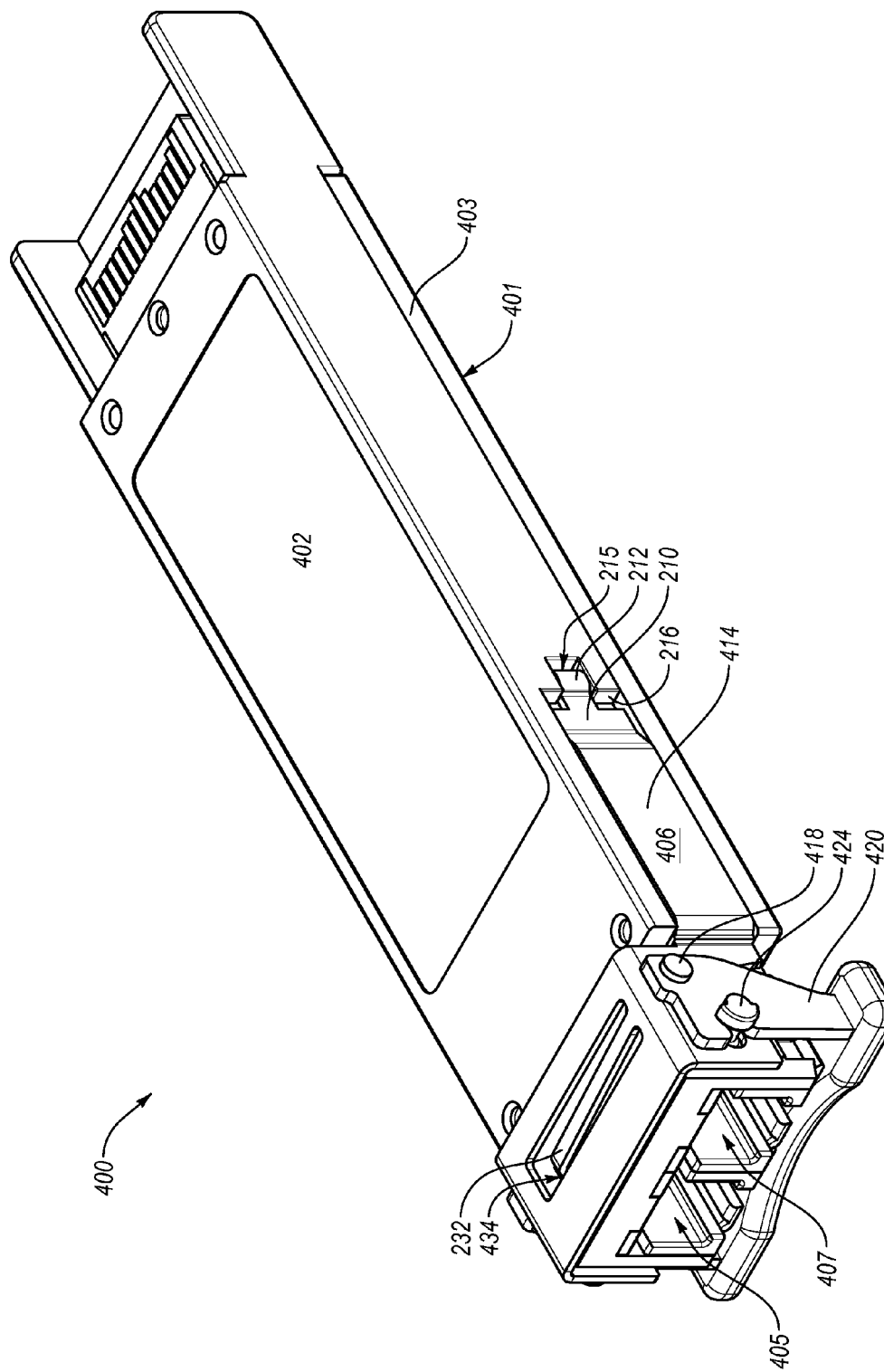
FIG. 4C is a bottom perspective view of the example optoelectronic module of FIG. 4A in the latched configuration.
Figure 4D:
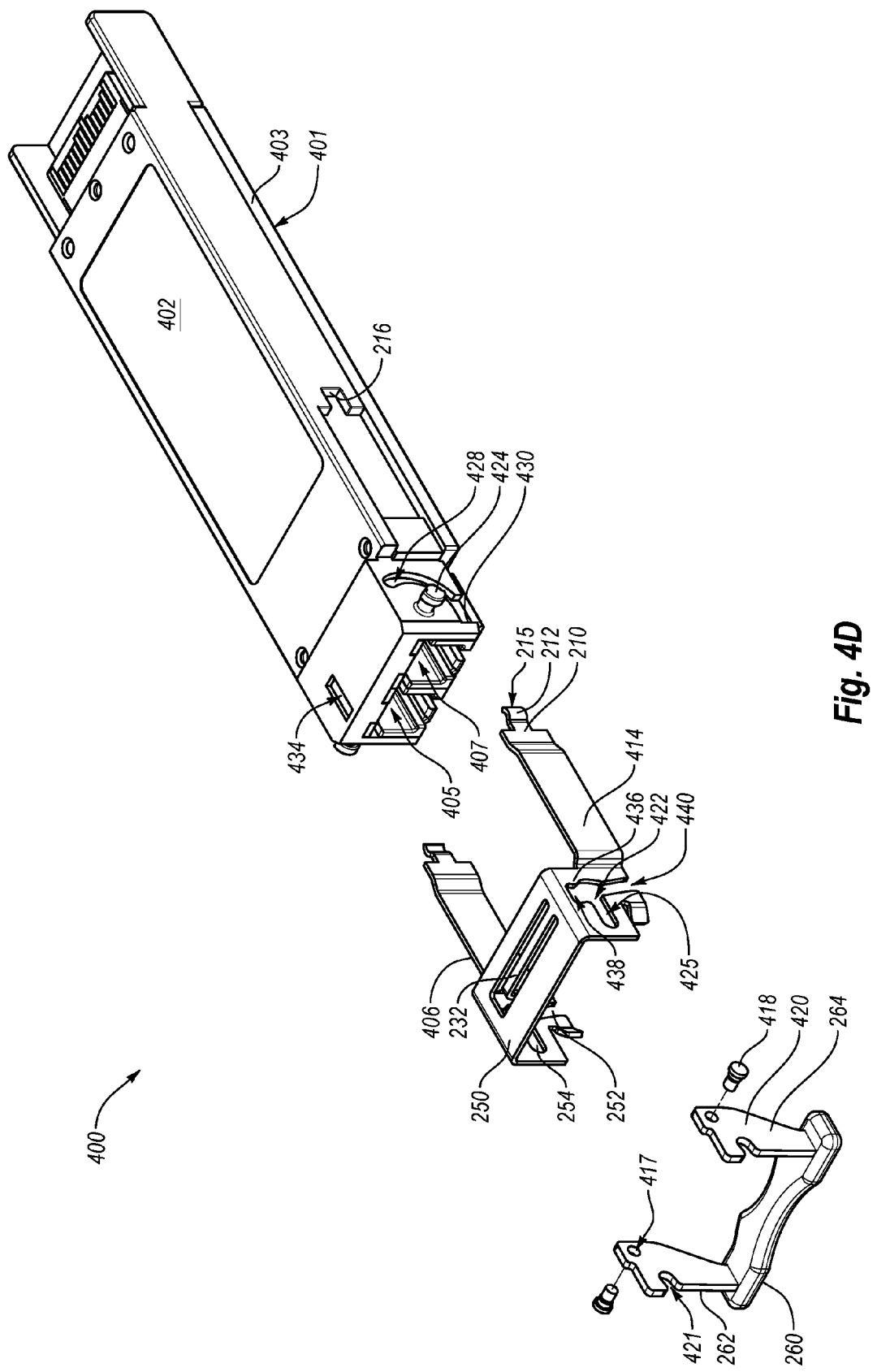
FIG. 4D is a bottom perspective exploded view of the example optoelectronic module of FIG. 4A.
Figure 4E:
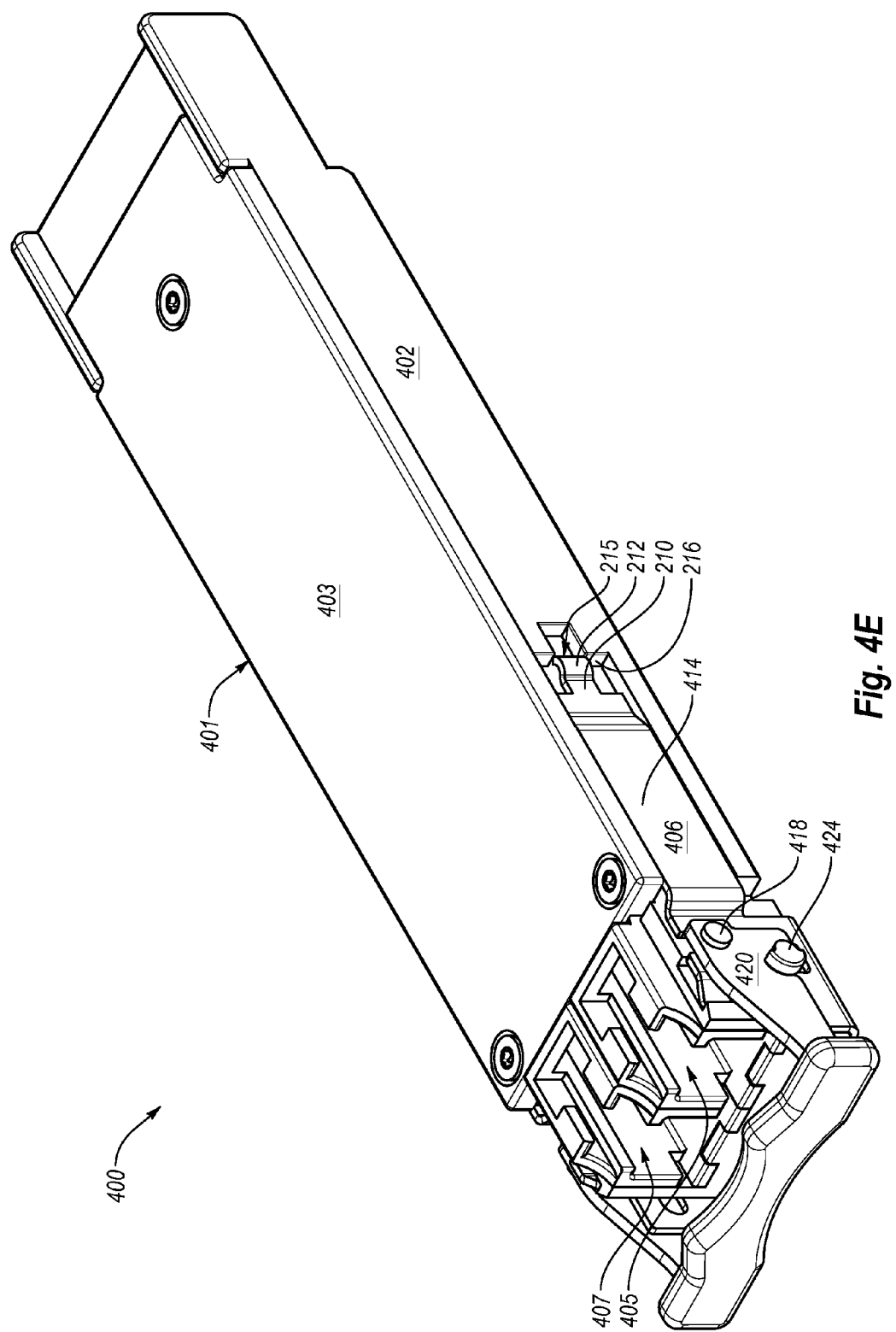
FIG. 4E is a top perspective view of the example optoelectronic module of FIG. 4A in an unlatched configuration.
Figure 4F:
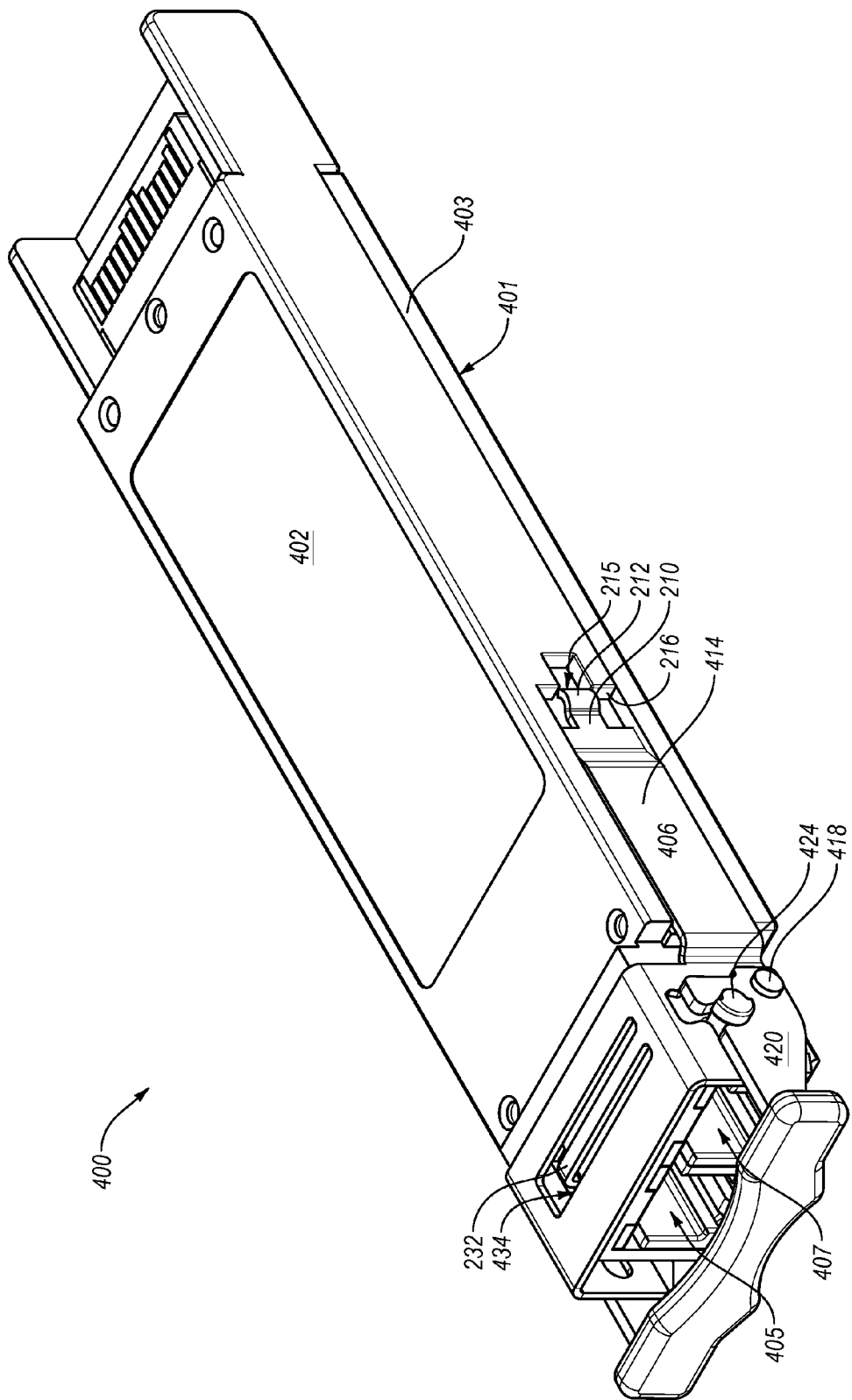
FIG. 4F is a bottom perspective view of the example optoelectronic module of FIG. 4A in the unlatched configuration.

FIGS. 4A-4F are various views of yet another example optoelectronic module 400. FIGS. 4A and 4E are top perspective views, FIG. 4B is a top perspective exploded view, FIGS. 4C and 4F are bottom perspective views, and FIG. 4D is a bottom perspective exploded view. FIGS. 4A and 4C show the optoelectronic module 400 in a latched configuration. FIGS. 4E and 4F show the optoelectronic module 400 in an unlatched configuration.

The example optoelectronic module 400 includes a bottom housing 402 and a top housing 403. Together, the bottom housing 402 and the top housing 403 form what may be generally referred to as a housing 401 of the optoelectronic module 400. The housing 401, the bottom housing 402, and the top housing 403 may generally correspond to the housing 201, the bottom housing 202, and the top housing 203 of FIGS. 2A-2F. The optoelectronic module 400 may include a transmit port 407 and a receive port 405 configured for optical signal transmission in a manner generally corresponding to the port 204 of FIGS. 2A-2F. More particularly, the optoelectronic module 400 may be configured to emit outbound optical data signals onto an optical network through an optical fiber and/or fiber optic connector coupled to the transmit port 407. In addition, the optoelectronic module 400 may be configured to receive inbound optical data signals from the optical network through an optical fiber and/or fiber optic connector coupled to the receive port 405.

The optoelectronic module 400 includes a driver 420 and a follower 406. The driver 420 and follower 406 may generally correspond to the driver 220 and follower 206 of FIGS. 2A-2F.

The follower 406 may include follower arms 414 generally corresponding to the follower arms 214 of FIGS. 2A-2F. EMI windows have been omitted from the embodiment of FIGS. 4A-4F. In other embodiments, the follower arms 414 include EMI windows similar or identical to the EMI windows 208 of FIGS. 2A-3F.

The optoelectronic module 400 may include pivot protrusions 424 configured to interface with pivot openings 421 of the driver 420 such that the driver 420 may rotate relative the housing 401 about a rotational axis defined by the pivot protrusions 424 and the pivot openings 421. Slots 425 in the follower 406 may allow the follower 406 to slide relative to the pivot protrusions 424.

Cam pins 418 may be inserted through openings 417 in the driver 420 and at least partially in openings 422 of the follower 406. Although optional, the cam pins 418 may be received in slots 428 of the housing 401 that generally correspond to slots 228 of FIGS. 2A-2F. In some embodiments, the cam pins 418 may form part of the driver 420. For example, the driver 420 may be cast or otherwise formed to integrally include the cam pins 418 as a portion of the driver 420.

The openings 422 may be shaped to encourage the follower 406 to move between the latched location (as shown in FIGS. 4A and 4C) and the unlatched location (as shown in FIGS. 4E and 4F) as the driver 420 is rotated between the latched and unlatched positions, respectively. In more detail, the openings 422 may include slots 440, protuberances 436, and concavities 438. The cam pins 418 may interface with the slots 440, the protuberances 336 and the concavities 438 of the openings 422 such that the cam pins 418 urge the follower 406 to the unlatched location when the driver 420 is rotated from the latched position to the unlatched position. Similarly, the cam pins 418 may interface with the openings 422 such that the cam pins 418 urge the follower 406 to the latched location when the driver 420 is rotated from the unlatched position to the latched position.

The slots 440, protuberances 436 and concavities 438 may generally correspond, at least in function, to the slots 240, the protuberances 236 and the concavities 238 of FIGS. 2A-2F.

Similar to the follower 206 of FIGS. 2A-2F, the follower 406 may include the cantilever spring 232, which may be configured to form a detent with the protuberances 436 and the concavities 438 in a manner generally corresponding to that of the optoelectronic module 200 of FIGS. 2A-2F.

The follower 406 may include stopping protrusions 408 configured to abut stops 430 on the housing 401 when the follower is in the unlatched location.

The driver 420 and the cam pins 418 may be pre-assembled together (and/or integrally formed together) before the driver 420, the follower 406 and the housing 401 are assembled together. Advantageously, assembling the latch mechanism may include placing only two pieces—the driver 420 including the cam pins 418 and the follower 406—on the housing 401. Advantageously, the two-piece assembly process may eliminate the time-consuming process of pressing pins into the assembly. The shape of the pivot protrusions 424 may allow the pivot protrusions 424 of the housing 401 to be inserted through the openings 422 of the follower 406 during assembly. To assemble the optoelectronic module 400, the follower 406 may be positioned on the housing 401 such that the openings in the slots 440 of the follower 406 align with the openings in the slots 428 of the housing 401. The cam pins 418 may then be inserted into the aligned openings of the slots 440 and the slots 428 as the pivot openings 421 are positioned on the pivot protrusions 424. Then, the follower 406 may be snapped into place on the housing 401, including inserting the cantilever spring 232 into an indentation 434 on the housing 401.

Accordingly, some embodiments described herein may include an optoelectronic module, such as the optoelectronic modules 200, 300, 400 described herein. The optoelectronic module may include a housing, a driver, and a follower, such as the housing 201, 301, 401, the driver 220, 320, 420, and the follower 206, 306, 406. In these and other embodiments, the driver may be rotatably coupled to the housing and may be configured to rotate relative to the housing about an axis of rotation. As illustrated in FIGS. 2A-4F, the driver may include a base 260 and first and second arms 262, 264 that extend in a common direction from opposite ends of the base 260, where the common direction is orthogonal or substantially orthogonal to the base 260. The follower may be slidably coupled to the housing and may be configured to slide forward or rearward relative to the housing in response to rotation of the driver about the axis of rotation.

The optoelectronic module may additionally first and second pivot members and first and second cam members. The pivot pins 224 in FIGS. 2A-3F and the pivot protrusions 424 of FIGS. 4A-4F are examples of first and second pivot members. The cam pins 218 and 418 of FIGS. 2A-4F are examples of first and second cam members. The first pivot member may be coupled to the first arm of the driver or to the housing. Analogously, the second pivot member may be coupled to the second arm of the driver or to the housing. The first and second pivot members define the axis of rotation. As illustrated in FIGS. 2A-4F, the first cam member may be coupled to the first arm of the driver at a first location radially offset from the axis of rotation, while the second cam member may be coupled to the second arm of the driver at a second location radially offset from the axis of rotation.

Alternately or additionally, some embodiments described herein may include a latch mechanism that includes a driver and a follower, such as the driver 220, 320, 420 and the follower 206, 306, 406 described herein. The driver may be configured to rotate relative to a housing of an optoelectronic module about an axis of rotation. The optoelectronic module and the housing may respectively include the optoelectronic module 200, 300, 400 and the housing 201, 301, 401 described herein.

The latch mechanism may additionally a pivot member and a cam member. The pivot pins 224 in FIGS. 2A-3F and the pivot protrusions 424 of FIGS. 4A-4F are each examples of the pivot member. The cam pins 218 and 418 of FIGS. 2A-4F are each examples of the cam member. The pivot member may be coupled to the driver or to the housing. The cam member may be coupled to the driver and may be configured to engage the follower from within an opening defined by the follower so as to urge the follower to slide relative to the housing as the driver is rotated between a latched position and an unlatched position.

The embodiments described herein may be combined or modified as desired and are not mutually exclusive unless explicitly stated or context dictates otherwise. For example, an optoelectronic module may include any of the optoelectronic modules 200, 300, 400 of FIGS. 2A-4F or other suitable optoelectronic modules. Alternately or additionally, a latch mechanism may include any of the latch mechanisms illustrated in FIGS. 2A-4F.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An optoelectronic module, comprising:
a housing;
a driver rotatably coupled to the housing and configured to rotate relative to the housing about an axis of rotation, wherein the driver comprises a base and first and second arms that extend in a common direction from opposite ends of the base, where the common direction is orthogonal to the base;
a first pivot member coupled to the first arm of the driver or to the housing;
a second pivot member coupled to the second arm of the driver or to the housing, wherein the first and second pivot members define the axis of rotation;
a first cam member coupled to the first arm of the driver at a first location radially offset from the axis of rotation;
a second cam member coupled to the second arm of the driver at a second location radially offset from the axis of rotation; and
a follower slidably coupled to the housing, wherein the follower is configured to slide forward or rearward relative to the housing in response to rotation of the driver about the axis of rotation, wherein the follower comprises a base and two upright portions that extend in a common direction that is orthogonal to the base of the follower and from opposite ends of the base of the follower, and wherein each of the upright portions includes an "L"-like opening that includes an upright slot connected to a horizontal slot.

2. The optoelectronic module of claim 1, wherein:
the follower further comprises a pair of arms that extend rearward from the upright portions and that are positioned on opposite sides of the housing;
each of the opposite sides of the housing includes a depression and a shoulder adjacent to the depression;
each shoulder is configured to be engaged by a corresponding one of two inwardly biased leaf springs located on opposite sides of a cage of a host device to engage the optoelectronic module within the cage;

each arm terminates with a recessed portion, a ramped surface, and a finger;
each recessed portion is configured to accommodate a corresponding one of the two inwardly biased leaf springs in engagement with a corresponding one of the shoulders;
each ramped surface is ramped from a corresponding recessed portion outward to a corresponding finger and is configured to deflect a corresponding one of the two inwardly biased leaf springs outward in response to the follower sliding forward relative to the housing; and
each finger is configured to maintain a corresponding one of the two inwardly biased leaf springs sufficiently outwardly deflected to disengage the optoelectronic module from the cage.

3. The optoelectronic module of claim 1, wherein:
the follower further comprises two arms positioned that extend rearward from the upright portions and that are positioned on opposite sides of the housing from each other;
each of the arms defines an electromagnetic interference (EMI) window;
the housing includes two EMI protrusions positioned on the opposite sides of the housing;
each of the two EMI protrusions protrudes through a corresponding one of the EMI windows; and
each of the two EMI protrusions is configured to be in contact with a cage of a host device in which the optoelectronic module is inserted without the arms of the follower being in contact with the cage.

4. The optoelectronic module of claim 1, wherein the first and second pivot members comprise first and second pivot pins inserted through openings defined in the first and second arms of the driver and threadably coupled to opposite sides of the housing.

5. The optoelectronic module of claim 1, wherein the first and second pivot members comprise first and second pivot protrusions that extend outward from opposite sides of the housing.

6. The optoelectronic module of claim 1, wherein:
the first cam member comprises a first cam pin that includes a head positioned on an outside of the first arm and a shaft that extends from the head of the first cam pin through the first arm toward the second arm; and
the second cam member comprises a second cam pin that includes a head positioned on an outside of the second arm and a shaft that extends from the head of the second cam pin through the second arm toward the first arm.

7. The optoelectronic module of claim 1, wherein:
the first and second cam members are configured to engage the follower from within the upright slots of the openings of the upright portions of the follower to slide the follower forward or rearward relative to the housing and responsive to rotation of the driver between the latched and unlatched positions;
a front of the housing is at least partially disposed between the two upright portions of the follower;
the two upright portions of the follower are at least partially disposed between the two arms of the driver; and
the horizontal slots of the openings of the upright portions of the follower each accommodate a corresponding one of the first or second pivot members without being encumbered thereby when the follower slides relative to the housing.

8. The optoelectronic module of claim 1, wherein:
the housing defines two indentations in a bottom surface of the housing that is adjacent to the base of the follower;
the optoelectronic module includes two compression springs, one each positioned in a corresponding one of the two indentations;
the base of the follower includes two upwardly-directed tabs, one each extending into a corresponding one of the two indentations to engage a rearward end of a corresponding one of the compression springs; and
the two compression springs urge against the two tabs to bias the follower toward a rear of the housing.

9. The optoelectronic module of claim 1, wherein:
the base includes a cantilever spring configured to cooperate with an indentation in a bottom surface of the housing that is adjacent to the base of the follower to urge the follower toward a front of the optoelectronic module.

10. A latch mechanism comprising:
a driver configured to rotate relative to a housing about an axis of rotation;
a follower configured to be slidably positioned relative the housing, wherein the follower includes a resilient member configured to interface with the housing and defines an opening that includes a protuberance;
a pivot member coupled to the driver, wherein the pivot member defines the axis of rotation; and
a cam member coupled to the driver and configured to engage the follower from within the opening so as to urge the follower to slide relative to the housing as the driver is rotated between a latched position and an unlatched position, wherein:
the follower comprises two arms positioned on opposite sides of the housing from each other;
each of the arms defines an electromagnetic interference (EMI) window;
the housing includes two EMI protrusions positioned on the opposite sides of the housing;
each of the two EMI protrusions protrudes through a corresponding one of the EMI windows; and
each of the two EMI protrusions is configured to be in contact with a cage of a host device in which an optoelectronic module that includes the housing is inserted without the arms of the follower being in contact with the cage.

11. The latch mechanism of claim 10, wherein:
in the latched position, the cam member is at a first location in a slot of the housing;
in the unlatched position, the cam member is at a second location in the slot that is in front of the first location; and
rotation of the driver from the latched position to the unlatched position causes the cam member to engage a frontward side of the opening and to urge the follower to slide, relative to the housing, toward a front of the housing.

12. The latch mechanism of claim 11, wherein rotation of the driver from the unlatched position to the latched position causes the cam member to engage a rearward side of the opening and to urge the follower to slide, relative to the housing, toward a rear of the housing that is in a direction opposite the front of the housing.

13. The latch mechanism of claim 10, wherein the protuberance is configured to interface with the cam member such that a bias generated by the resilient member must be overcome to rotate the driver from the latched position to the unlatched position.

14. The latch mechanism of claim 10, wherein:
the pivot member comprises a pivot pin inserted through a first opening defined in the driver and threadably coupled to the housing;
the driver is configured to rotate about the pivot pin;

the cam member comprises a cam pin that includes a head positioned on one side of a portion of the driver and a shaft that extends from the head through a second opening defined in the portion of the driver and beyond the portion of the driver.

15. The latch mechanism of claim 10, wherein:
each of the opposite sides of the housing includes a depression and a shoulder adjacent to the depression;
each shoulder is configured to be engaged by a corresponding one of two inwardly biased leaf springs located on opposite sides of the cage;
each of the arms terminates with a recessed portion, a ramped surface, and a finger;
each recessed portion is configured to accommodate a corresponding one of the two inwardly biased leaf springs in engagement with a corresponding one of the shoulders;
each ramped surface is ramped from a corresponding recessed portion outward to a corresponding finger and is configured to deflect a corresponding one of the two inwardly biased leaf springs outward in response to the follower sliding forward relative to the housing; and
each finger is configured to maintain a corresponding one of the two inwardly biased leaf springs sufficiently outwardly deflected to disengage the shoulders from the cage.

16. The latch mechanism of claim 10, wherein the cam member is coupled to the driver at a first location radially offset from the axis of rotation such that the cam member follows a semicircular path in response to rotation of the driver.

17. A latch mechanism comprising:
a driver configured to rotate relative to a housing about an axis of rotation;
a follower configured to be slidably positioned relative the housing, wherein the follower includes a resilient member configured to interface with the housing and defines an opening that includes a protuberance;
a pivot member coupled to the driver, wherein the pivot member defines the axis of rotation; and
a cam member coupled to the driver and configured to engage the follower from within the opening so as to urge the follower to slide relative to the housing as the driver is rotated between a latched position and an unlatched position, wherein:
the pivot member comprises a pivot pin inserted through a first opening defined in the driver and threadably coupled to the housing;
the driver is configured to rotate about the pivot pin;
the cam member comprises a cam pin that includes a head positioned on one side of a portion of the driver and a shaft that extends from the head through a second opening defined in the portion of the driver and beyond the portion of the driver.

18. The latch mechanism of claim 17, wherein:
in the latched position, the cam member is at a first location in a slot of the housing;
in the unlatched position, the cam member is at a second location in the slot that is in front of the first location; and
rotation of the driver from the latched position to the unlatched position causes the cam member to engage a frontward side of the opening and to urge the follower to slide, relative to the housing, toward a front of the housing.

19. The latch mechanism of claim 18, wherein rotation of the driver from the unlatched position to the latched position causes the cam member to engage a rearward side of the opening and to urge the follower to slide, relative to the housing, toward a rear of the housing that is in a direction opposite the front of the housing.

20. The latch mechanism of claim 17, wherein the cam member is coupled to the driver at a first location radially offset from the axis of rotation such that the cam member follows a semicircular path in response to rotation of the driver.

* * * * *